US011206076B2

United States Patent
Onggosanusi et al.

(10) Patent No.: US 11,206,076 B2
(45) Date of Patent: Dec. 21, 2021

(54) METHOD AND APPARATUS FOR LOW-LATENCY BEAM SELECTION

(71) Applicant: Samsung Electronics Co., Ltd., Suwon-si (KR)

(72) Inventors: Eko Onggosanusi, Coppell, TX (US); Md. Saifur Rahman, Plano, TX (US)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 16/946,915

(22) Filed: Jul. 10, 2020

(65) Prior Publication Data

US 2021/0044343 A1 Feb. 11, 2021

Related U.S. Application Data

(60) Provisional application No. 62/883,942, filed on Aug. 7, 2019, provisional application No. 62/885,664, filed on Aug. 12, 2019.

(51) Int. Cl.
*H04B 7/06* (2006.01)

(52) U.S. Cl.
CPC ............ *H04B 7/0695* (2013.01); *H04B 7/063* (2013.01)

(58) Field of Classification Search
CPC .. H04B 7/0617; H04B 7/0404; H04B 7/0695; H04B 7/088; H04L 5/0053; H04L 5/0048; H04L 5/0098; H04L 1/1861; H04L 1/1887; H04L 1/1893; H04L 25/0226; H04L 41/0654; H04L 5/0051; H04W 52/146; H04W 72/0413; H04W 72/042; H04W 52/08; H04W 52/10; H04W 16/28; H04W 80/02
See application file for complete search history.

(56) References Cited

U.S. PATENT DOCUMENTS

| | | | | |
|---|---|---|---|---|
| 2018/0234960 | A1* | 8/2018 | Nagaraja | H04B 17/318 |
| 2019/0074882 | A1* | 3/2019 | Zhou | H04W 72/046 |
| 2019/0075014 | A1* | 3/2019 | Zhou | H04W 72/042 |
| 2019/0296875 | A1* | 9/2019 | Qin | H04L 5/0094 |
| 2019/0335477 | A1* | 10/2019 | Nam | H04B 7/0626 |
| 2019/0349124 | A1* | 11/2019 | Tang | H04L 5/0082 |
| 2019/0372734 | A1* | 12/2019 | Choi | H04L 5/00 |

(Continued)

FOREIGN PATENT DOCUMENTS

WO 2018203680 A1 11/2018

OTHER PUBLICATIONS

"LTE; Evolved Universal Terrestrial Radio Access (E-UTRA); Physical channels and modulation (3GPP TS 36.211 version 12.4.0 Release 12)", Feb. 2015, 126 pages.

(Continued)

*Primary Examiner* — Khanh C Tran

(57) ABSTRACT

Methods and apparatuses for low-latency beam selection. A method for operating user equipment (UE) includes receiving configuration information on a set of uplink (UL) beams and at least one associated sounding reference signal (SRS) resource. Each of the UL beams is associated with one RS resource. The method further includes detecting that an event occurs; calculating an UL beam reporting associated with at least one of the UL beams; initiating or receiving a request for an SRS transmission; and transmitting the UL beam reporting after the event occurs.

20 Claims, 20 Drawing Sheets

(56) References Cited

U.S. PATENT DOCUMENTS

| | | | |
|---|---|---|---|
| 2019/0394762 A1* | 12/2019 | Tang | H04B 7/0408 |
| 2020/0162289 A1 | 5/2020 | Ahn et al. | |
| 2020/0220676 A1* | 7/2020 | Xu | H04B 7/06 |
| 2021/0006456 A1* | 1/2021 | Kim | H04W 72/14 |

OTHER PUBLICATIONS

"LTE; Evolved Universal Terrestrial Radio Access (E-UTRA); Multiplexing and channel coding (3GPP TS 36.212 version 12.3.0 Release 12)", Feb. 2015, 91 pages.

"LTE; Evolved Universal Terrestrial Radio Access (E-UTRA); Physical layer procedures (3GPP TS 36.213 version 12.4.0 Release 12)", Feb. 2015, 227 pages.

"LTE; Evolved Universal Terrestrial Radio Access (E-UTRA); Medium Access Control (MAC) protocol specification (3GPP TS 36.321 version 12.4.0 Release 12)", Feb. 2015, 62 pages.

"LTE; Evolved Universal Terrestrial Radio Access (E-UTRA); Radio Resource Control (RRC); Protocol specification (3GPP TS 36.331 version 12.4.1 Release 12)", Feb. 2015, 415 pages.

"3rd Generation Partnership Project; Technical Specification Group Radio Access Network; NR; Physical channels and modulation (Release 15)", 3GPP TS 38.211 V15.0.0, Dec. 2017, 73 pages.

"3rd Generation Partnership Project; Technical Specification Group Radio Access Network; NR; Multiplexing and channel coding (Release 15)", 3GPP TS 38.212 V15.0.0, Dec. 2017, 82 pages.

"3rd Generation Partnership Project; Technical Specification Group Radio Access Network; NR; Physical layer procedures (Release 15)", 3GPP TS 38.213 V15.0.0, Dec. 2017, 56 pages.

"3rd Generation Partnership Project; Technical Specification Group Radio Access Network; NR; Physical layer procedures for data (Release 15)", 3GPP TS 38.214 V15.0.0, Dec. 2017, 71 pages.

"3rd Generation Partnership Project; Technical Specification Group Radio Access Network; NR; Medium Access Control (MAC) protocol specification (Release 15)", 3GPP TS 38.321 V15.0.0, Dec. 2017, 55 pages.

"3rd Generation Partnership Project; Technical Specification Group Radio Access Network; NR; Radio Resource Control (RRC) protocol specification (Release 15)", 3GPP TS 38.331 V15.0.0, Dec. 2017, 188 pages.

"3rd Generation Partnership Project; Technical Specification Group Radio Access Network; NR; Physical layer measurements (Release 15)", 3GPP TS 38.215, V15.0.0, Dec. 2017, 13 pages.

International Search Report and Written Opinion of the International Searching Authority in connection with International Application No. PCT/KR2020/010280 dated Oct. 26, 2020, 9 pages.

Huawei et al., "Beam measurement and reporting," R1-1717301, 3GPP TSG RAN WG1 Meeting #90bis, Prague, Czech Republic, Oct. 9-13, 2017, 7 pages.

Intel Corporation, "On Beam Management Enhancement," R1-1906816, 3GPP TAG RAN WG1 Meeting #97, Reno, USA, May 13-17, 2019, 16 pages.

ZTE, "Enhancements on multi-beam operation," R1-1906237, 3GPP TSG RAN WG1 Meeting #97, Reno, USA, May 13-17, 2019, 18 pages.

Fraunhofer IIS, "NR beam management supporting multi-gNB measurements for positioning," R1-1813583, 3GPP TSG RAN WG1 Meeting #95, Spokane, US, Nov. 12-16, 2018, 8 pages.

* cited by examiner

METHOD AND APPARATUS FOR LOW-LATENCY BEAM SELECTION

CROSS-REFERENCE TO RELATED APPLICATIONS AND CLAIM OF PRIORITY

This application claims priority to U.S. Provisional Patent Application No. 62/883,942 filed Aug. 7, 2019 and U.S. Provisional Patent Application No. 62/885,664 filed Aug. 12, 2019. The above-identified provisional patent applications are hereby incorporated by reference in their entirety.

TECHNICAL FIELD

The present disclosure relates generally to wireless communication systems and, more specifically, beam selection for multi-beam system.

BACKGROUND

Wireless communication has been one of the most successful innovations in modern history. The demand of wireless data traffic is rapidly increasing due to the growing popularity among consumers and businesses of smart phones and other mobile data devices, such as tablets, "note pad" computers, net books, eBook readers, and machine type of devices. To meet the high growth in mobile data traffic and support new applications and deployments, improvements in radio interface efficiency and coverage is of paramount importance.

A mobile device or user equipment can measure the quality of the downlink channel and report this quality to a base station so that a determination can be made regarding whether or not various parameters should be adjusted during communication with the mobile device. Existing channel quality reporting processes in wireless communications systems do not sufficiently accommodate reporting of channel state information associated with large, two-dimensional array transmit antennas or, in general, antenna array geometry which accommodates a large number of antenna elements.

SUMMARY

Various embodiments of the present disclosure provide methods and apparatuses for low-latency beam selection.

In one embodiment, a user equipment (UE) is provided. The UE includes a transceiver configured to receive configuration information on a set of uplink (UL) beams and at least one associated sounding reference signal (SRS) resource. Each of the UL beams is associated with one RS resource. The UE also includes a processor operably connected to the transceiver. The processor is configured to detect that an event occurs and calculate an UL beam reporting associated with at least one of the UL beams. The transceiver is further configured to initiate or receive a request for an SRS transmission and transmit the UL beam reporting after the event occurs.

In another embodiment, a base station (BS) is provided. The BS includes a processor configured to generate configuration information on a set of UL beams and at least one associated SRS resource. Each of the UL beams is associated with one RS resource The BS also includes a transceiver operably connected to the processor. The transceiver is configured to transmit the configuration information for the UL beams and the at least one associated SRS resource; receive or transmit a request for an SRS transmission; and receive an UL beam reporting associated with at least one of the UL beams after an event occurs.

In yet another embodiment, a method for operating a UE is provided. The method includes receiving configuration information on a set of UL beams and at least one associated SRS resource. Each of the UL beams is associated with one RS resource. The method further includes detecting that an event occurs; calculating an UL beam reporting associated with at least one of the UL beams; initiating or receiving a request for an SRS transmission; and transmitting the UL beam reporting after the event occurs.

The present disclosure relates to a pre-5th-Generation (5G) or 5G communication system to be provided for supporting higher data rates Beyond 4th-Generation (4G) communication system such as Long-Term Evolution (LTE).

Other technical features may be readily apparent to one skilled in the art from the following figures, descriptions, and claims.

Before undertaking the DETAILED DESCRIPTION below, it can be advantageous to set forth definitions of certain words and phrases used throughout this disclosure. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller can be implemented in hardware or a combination of hardware and software and/or firmware. The functionality associated with any particular controller can be centralized or distributed, whether locally or remotely. The phrase "at least one of," when used with a list of items, means that different combinations of one or more of the listed items can be used, and only one item in the list can be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this disclosure. Those of ordinary skill in the art should understand that in many, if not most, instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
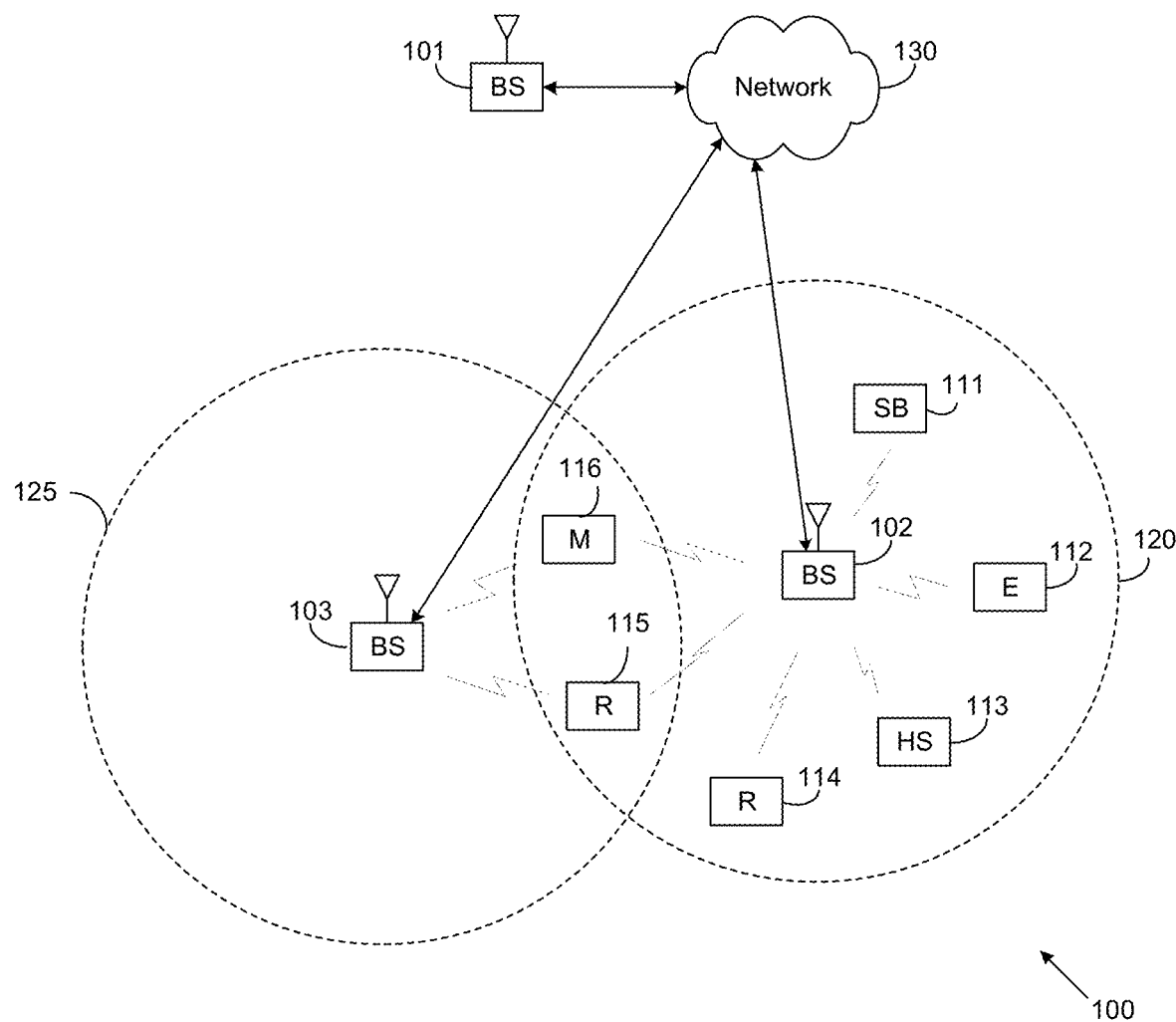
FIG. 1 illustrates an example wireless network according to various embodiments of the present disclosure.

FIGS. 1 through 14, discussed below, and the various embodiments used to describe the principles of the present disclosure in this disclosure are by way of illustration only and should not be construed in any way to limit the scope of the disclosure. Those skilled in the art will understand that the principles of the present disclosure can be implemented in any suitably arranged wireless communication system.

LIST OF ACRONYMS

2D: two-dimensional
MIMO: multiple-input multiple-output
SU-MIMO: single-user MIMO
MU-MIMO: multi-user MIMO
3GPP: 3rd generation partnership project
LTE: long-term evolution
UE: user equipment
eNB: evolved Node B or "eNB"
BS: base station
DL: downlink
UL: uplink
CRS: cell-specific reference signal(s)
DMRS: demodulation reference signal(s)
SRS: sounding reference signal(s)
UE-RS: UE-specific reference signal(s)
CSI-RS: channel state information reference signals
SCID: scrambling identity
MCS: modulation and coding scheme
RE: resource element
CQI: channel quality information
PMI: precoding matrix indicator
RI: rank indicator
MU-CQI: multi-user CQI
CSI: channel state information
CSI-IM: CSI interference measurement
CoMP: coordinated multi-point
DCI: downlink control information
UCI: uplink control information
PDSCH: physical downlink shared channel
PDCCH: physical downlink control channel
PUSCH: physical uplink shared channel PUCCH: physical uplink control channel
RB: physical resource block
RRC: radio resource control
AoA: angle of arrival
AoD: angle of departure The following documents and standards descriptions are hereby incorporated by reference into the present disclosure as if fully set forth herein: 3GPP Technical Specification (TS) 36.211 version 12.4.0, "E-UTRA, Physical channels and modulation" ("REF 1"); 3GPP TS 36.212 version 12.3.0, "E-UTRA, Multiplexing and Channel coding" ("REF 2"); 3GPP TS 36.213 version 12.4.0, "E-UTRA, Physical Layer Procedures" ("REF 3"); 3GPP TS 36.321 version 12.4.0, "E-UTRA, Medium Access Control (MAC) Protocol Specification" ("REF 4"); 3GPP TS 36.331 version 12.4.0, "E-UTRA, Radio Resource Control (RRC) Protocol Specification" ("REF 5"); 3GPP Technical Specification (TS) 38.211 version 15.0.0, "NR, Physical channels and modulation" ("REF 6"); 3GPP TS 38.212 version 15.0.0, "NR, Multiplexing and Channel coding" ("REF 7"); 3GPP TS 38.213 version 15.0.0, "NR, Physical Layer Procedures for Control" ("REF 8"); 3GPP TS 38.214 version 15.0.0, "NR, Physical Layer Procedures for Data" ("REF 9"); 3GPP TS 38.321 version 15.0.0, "NR, Medium Access Control (MAC) Protocol Specification" ("REF 10"); 3GPP TS 38.331 version 15.0.0, "NR, Radio Resource Control (RRC) Protocol Specification" ("REF 11"); and 3GPP TS 38.215 version 15.0.0, "NR, Physical Layer Measurements" ("REF 12")".

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 28 GHz or 60 GHz bands or, in general, above 6 GHz bands, so as to accomplish higher data rate, or in lower frequency bands, such as below 6 GHz, to enable robust coverage and mobility supports. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed. The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band.

FIG. 1 illustrates an example wireless network 100 according to various embodiments of the present disclosure. The embodiment of the wireless network 100 shown in FIG. 1 is for illustration only. Other embodiments of the wireless network 100 can be used without departing from the scope of the present disclosure.

The wireless network 100 includes a BS 101, a BS 102, and a BS 103. The BS 101 communicates with the BS 102 and the BS 103. The BS 101 also communicates with at least one Internet Protocol (IP) network 130, such as the Internet, a proprietary IP network, or other data network. Instead of "BS", an option term such as "eNB" (enhanced Node B) or "gNB" (general Node B) can also be used. Depending on the network type, other well-known terms can be used instead of "gNB" or "BS," such as "base station" or "access point." For the sake of convenience, the terms "gNB" and "BS" are used in the present disclosure to refer to network infrastructure components that provide wireless access to remote terminals. Depending on the network type, other well-known terms can be used instead of "user equipment" or "UE," such as "mobile station," "subscriber station," "remote terminal," "wireless terminal," or "user device." For the sake of convenience, the terms "user equipment" and "UE" are used in the present disclosure to refer to remote wireless equipment that wirelessly accesses an gNB, whether the UE is a mobile device (such as a mobile telephone or smartphone) or is normally considered a stationary device (such as a desktop computer or vending machine).

The gNB 102 provides wireless broadband access to the network 130 for a first plurality of UEs within a coverage area 120 of the gNB 102. The first plurality of UEs includes a UE 111, which can be located in a small business (SB); a UE 112, which can be located in an enterprise (E); a UE 113, which can be located in a WiFi hotspot (HS); a UE 114, which can be located in a first residence (R); a UE 115, which can be located in a second residence (R); and a UE 116, which can be a mobile device (M) like a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 can communicate with each other and with the UEs 111-116 using 5G, LTE, LTE-A, WiMAX, or other advanced wireless communication techniques.

Dotted lines show the approximate extents of the coverage areas 120 and 125, which are shown as approximately circular for the purposes of illustration and explanation only. For example, the coverage areas associated with gNBs, such as the coverage areas 120 and 125, can have other shapes, including irregular shapes, depending upon the configuration of the gNBs and variations in the radio environment associated with natural and man-made obstructions.

As described in more detail below, one or more of gNB 101, gNB 102, and gNB 103 transmits beam reporting information to UEs 111-116 and configure UEs 111-116 for beam reporting as described in embodiments of the present disclosure. In various embodiments, one or more of UEs 111-116 receive beam reporting information as described in embodiments of the present disclosure.

Although FIG. 1 illustrates one example of a wireless network 100, various changes can be made to FIG. 1. For example, the wireless network 100 can include any number of gNB s and any number of UEs in any suitable arrangement. The gNB 101 can communicate directly with any number of UEs and provide those UEs with wireless broadband access to the network 130. Similarly, each gNB 102-

103 can communicate directly with the network 130 and provide UEs with direct wireless broadband access to the network 130. Further, the gNB 101, 102, and/or 103 can provide access to other or additional external networks, such as external telephone networks or other types of data networks.

Figure 2A:
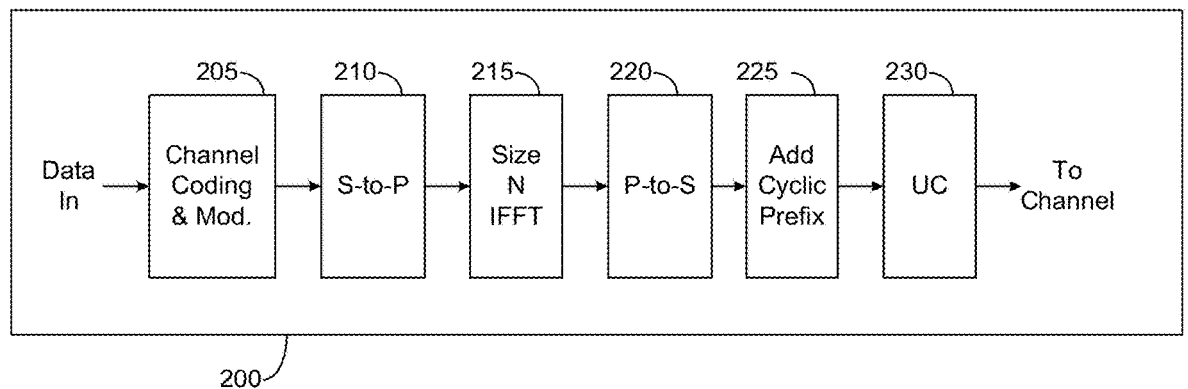
FIGS. 2A and 2B illustrate example wireless transmit and receive paths according to various embodiments of the present disclosure.
Figure 2B:
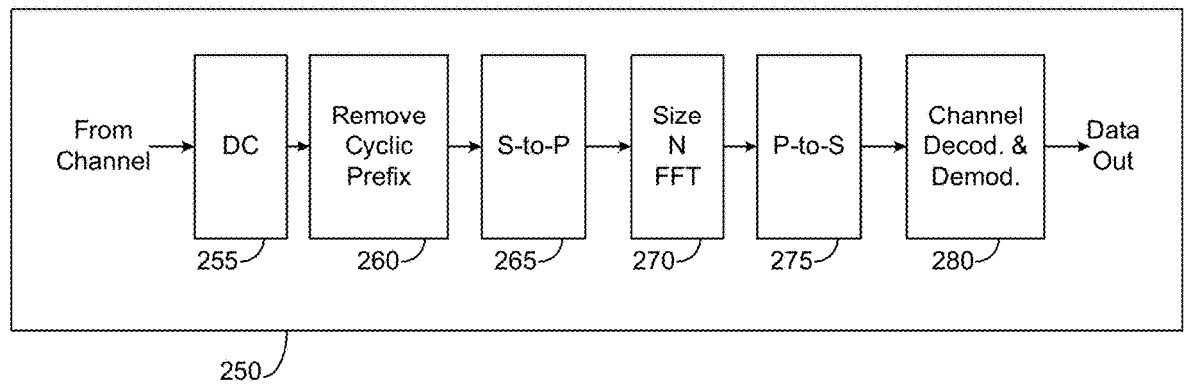

FIGS. 2A and 2B illustrate example wireless transmit and receive paths according to the present disclosure. In the following description, a transmit path 200 can be described as being implemented in a gNB (such as gNB 102), while a receive path 250 can be described as being implemented in a UE (such as UE 116). However, it will be understood that the receive path 250 can be implemented in a gNB and that the transmit path 200 can be implemented in a UE. In some embodiments, the receive path 250 is configured to receive beam reporting information as described in embodiments of the present disclosure.

The transmit path 200 includes a channel coding and modulation block 205, a serial-to-parallel (S-to-P) block 210, a size N Inverse Fast Fourier Transform (IFFT) block 215, a parallel-to-serial (P-to-S) block 220, an 'add cyclic prefix' block 225, and an up-converter (UC) 230. The receive path 250 includes a down-converter (DC) 255, a 'remove cyclic prefix' block 260, a serial-to-parallel (S-to-P) block 265, a size N Fast Fourier Transform (FFT) block 270, a parallel-to-serial (P-to-S) block 275, and a channel decoding and demodulation block 280.

In the transmit path 200, the channel coding and modulation block 205 receives a set of information bits, applies coding (such as convolutional, Turbo, or low-density parity check (LDPC) coding), and modulates the input bits (such as with Quadrature Phase Shift Keying (QPSK) or Quadrature Amplitude Modulation (QAM)) to generate a sequence of frequency-domain modulation symbols. The S-to-P block 210 converts (such as de-multiplexes) the serial modulated symbols to parallel data in order to generate N parallel symbol streams, where N is the IFFT/FFT size used in the gNB 102 and the UE 116. The size N IFFT block 215 performs an IFFT operation on the N parallel symbol streams to generate time-domain output signals. The P-to-S block 220 converts (such as multiplexes) the parallel time-domain output symbols from the size N IFFT block 215 in order to generate a serial time-domain signal. The 'add cyclic prefix' block 225 inserts a cyclic prefix to the time-domain signal. The UC 230 modulates (such as up-converts) the output of the 'add cyclic prefix' block 225 to an RF frequency for transmission via a wireless channel. The signal can also be filtered at baseband before conversion to the RF frequency.

A transmitted RF signal from the gNB 102 arrives at the UE 116 after passing through the wireless channel, and reverse operations to those at the gNB 102 are performed at the UE 116. The DC 255 down-converts the received signal to a baseband frequency, and the 'remove cyclic prefix' block 260 removes the cyclic prefix to generate a serial time-domain baseband signal. The serial-to-parallel block 265 converts the time-domain baseband signal to parallel time domain signals. The size N FFT block 270 performs an FFT algorithm to generate N parallel frequency-domain signals. The parallel-to-serial block 275 converts the parallel frequency-domain signals to a sequence of modulated data symbols. The channel decoding and demodulation block 280 demodulates and decodes the modulated symbols to recover the original input data stream.

As described in more detail below, the transmit path 200 or the receive path 250 can perform signaling for beam reporting. Each of the gNBs 101-103 can implement a transmit path 200 that is analogous to transmitting in the downlink to UEs 111-116 and can implement a receive path 250 that is analogous to receiving in the uplink from UEs 111-116. Similarly, each of UEs 111-116 can implement a transmit path 200 for transmitting in the uplink to gNBs 101-103 and can implement a receive path 250 for receiving in the downlink from gNBs 101-103.

Each of the components in FIGS. 2A and 2B can be implemented using only hardware or using a combination of hardware and software/firmware. As a particular example, at least some of the components in FIGS. 2A and 2B can be implemented in software, while other components can be implemented by configurable hardware or a mixture of software and configurable hardware. For instance, the size N FFT block 270 and the size N IFFT block 215 can be implemented as configurable software algorithms, where the value of size N can be modified according to the implementation.

Furthermore, although described as using FFT and IFFT, this is by way of illustration only and should not be construed to limit the scope of the present disclosure. Other types of transforms, such as Discrete Fourier Transform (DFT) and Inverse Discrete Fourier Transform (IDFT) functions, can be used. It will be appreciated that the value of the variable N can be any integer number (such as 1, 2, 3, 4, or the like) for DFT and IDFT functions, while the value of the variable N can be any integer number that is a power of two (such as 1, 2, 4, 8, 16, or the like) for FFT and IFFT functions.

Although FIGS. 2A and 2B illustrate examples of wireless transmit and receive paths, various changes can be made to FIGS. 2A and 2B. For example, various components in FIGS. 2A and 2B can be combined, further subdivided, or omitted and additional components can be added according to particular needs. FIGS. 2A and 2B are meant to illustrate examples of the types of transmit and receive paths that can be used in a wireless network. Other suitable architectures can be used to support wireless communications in a wireless network.

Figure 3A:
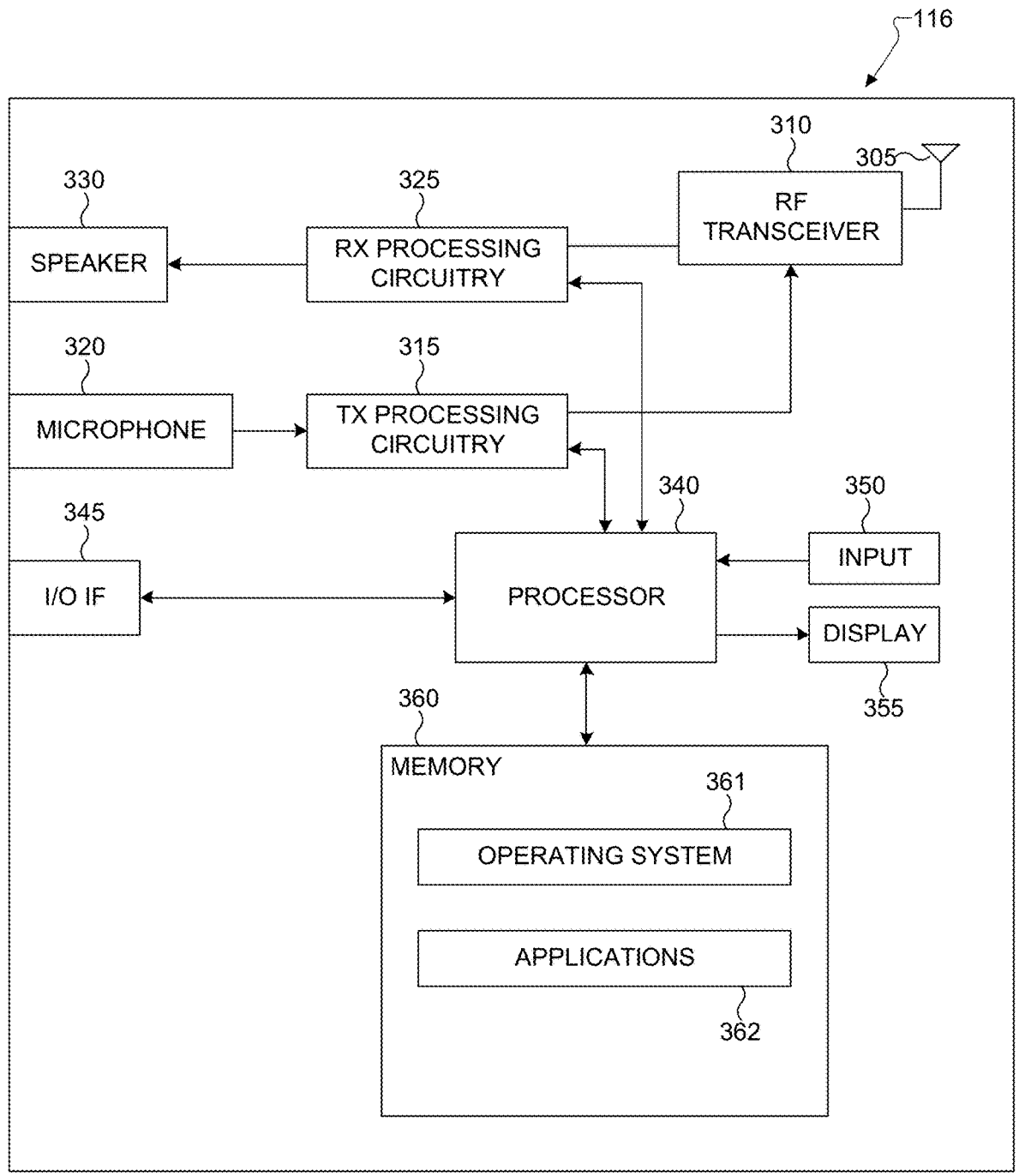
FIG. 3A illustrates an example user equipment according to various embodiments of the present disclosure.

FIG. 3A illustrates an example UE 116 according to the present disclosure. The embodiment of the UE 116 illustrated in FIG. 3A is for illustration only, and the UEs 111-115 of FIG. 1 can have the same or similar configuration. However, UEs come in a wide variety of configurations, and FIG. 3A does not limit the scope of the present disclosure to any particular implementation of a UE.

The UE 116 includes an antenna 305, a radio frequency (RF) transceiver 310, transmit (TX) processing circuitry 315, a microphone 320, and receive (RX) processing circuitry 325. The UE 116 also includes a speaker 330, a processor 340, an input/output (I/O) interface 345, an input 350, a display 355, and a memory 360. The memory 360 includes an operating system (OS) program 361 and one or more applications 362.

The RF transceiver 310 receives, from the antenna 305, an incoming RF signal transmitted by a gNB of the wireless network 100 of FIG. 1. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS program 361 stored in the memory 360 in order to control the overall operation of the UE 116. For example, the processor 340 can control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 can execute other processes and programs resident in the memory 360, such as operations for NZP or ZP CSI-RS reception and measurement for systems described in embodiments of the present disclosure as described in embodiments of the present disclosure. The processor 340 can move data into or out of the memory 360 as part of an executing process. In some embodiments, the processor 340 is configured to execute the applications 362 based on the OS program 361 or in response to signals received from gNBs or an operator. The processor 340 is also coupled to the I/O interface 345, which provides the UE 116 with the ability to connect to other devices such as laptop computers and handheld computers. The I/O interface 345 is the communication path between these accessories and the processor 340.

The processor 340 is also coupled to the input 350 (e.g., keypad, touchscreen, button etc.) and the display 355. The operator of the UE 116 can use the input 350 to enter data into the UE 116. The display 355 can be a liquid crystal display or other display capable of rendering text and/or at least limited graphics, such as from web sites.

The memory 360 is coupled to the processor 340. The memory 360 can include at least one of a random-access memory (RAM), Flash memory, or other read-only memory (ROM).

As described in more detail below, the UE 116 can perform signaling and calculation for low-latency beam selection. Although FIG. 3A illustrates one example of UE 116, various changes can be made to FIG. 3A. For example, various components in FIG. 3A can be combined, further subdivided, or omitted and additional components can be added according to particular needs. As a particular example, the processor 340 can be divided into multiple processors, such as one or more central processing units (CPUs) and one or more graphics processing units (GPUs). Although FIG. 3A illustrates the UE 116 as a mobile telephone or smartphone, UEs can be configured to operate as other types of mobile or stationary devices.

Figure 3B:
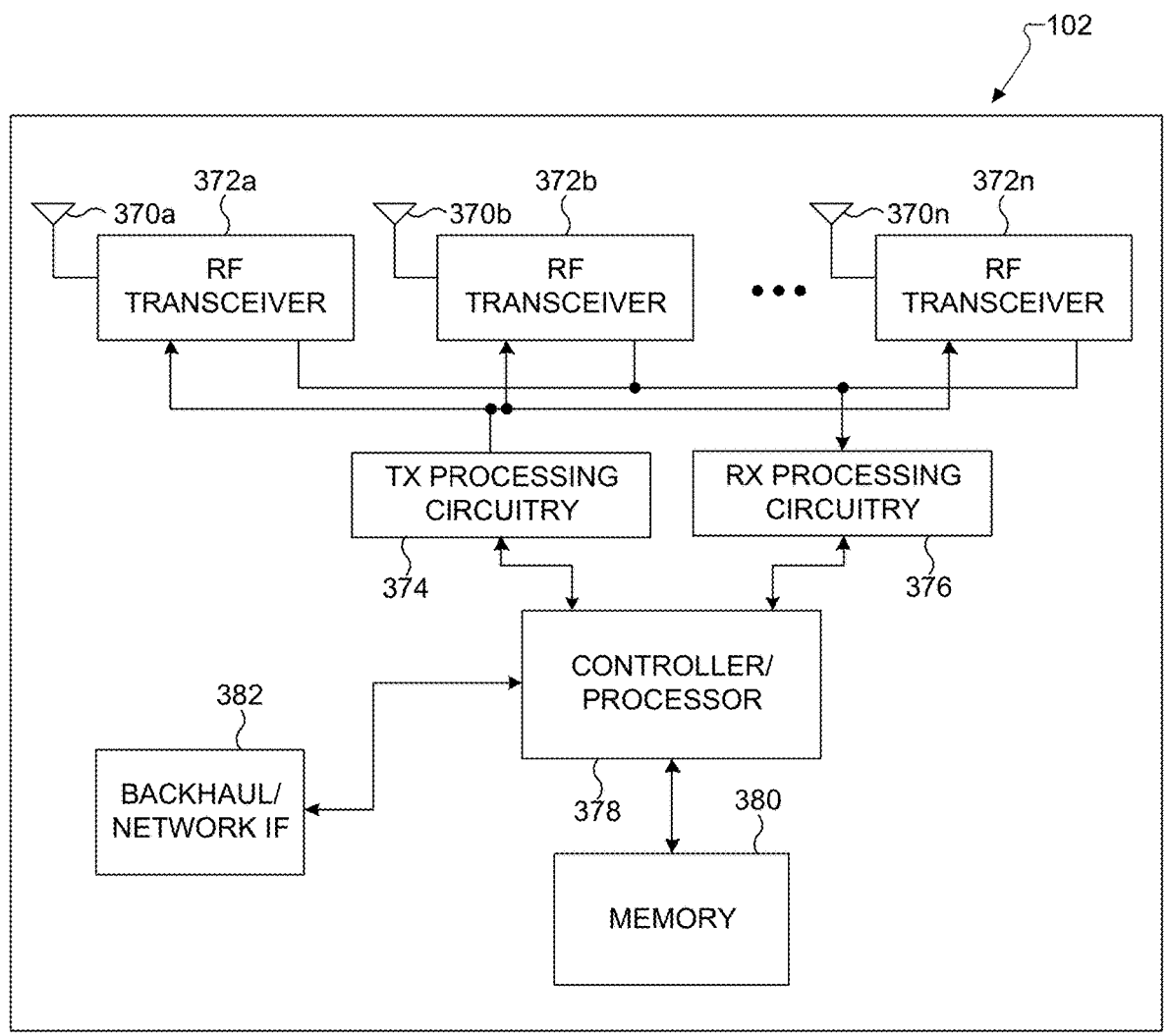
FIG. 3B illustrates an example BS according to various embodiments of the present disclosure.

FIG. 3B illustrates an example gNB 102 according to the present disclosure. The embodiment of the gNB 102 shown in FIG. 3B is for illustration only, and other gNBs of FIG. 1 can have the same or similar configuration. However, gNBs come in a wide variety of configurations, and FIG. 3B does not limit the scope of the present disclosure to any particular implementation of a gNB. The gNB 101 and the gNB 103 can include the same or similar structure as the gNB 102.

As shown in FIG. 3B, the gNB 102 includes multiple antennas 370a-370n, multiple RF transceivers 372a-372n, transmit (TX) processing circuitry 374, and receive (RX) processing circuitry 376. In certain embodiments, one or more of the multiple antennas 370a-370n include 2D antenna arrays. The gNB 102 also includes a controller/processor 378, a memory 380, and a backhaul or network interface 382.

The RF transceivers 372a-372n receive, from the antennas 370a-370n, incoming RF signals, such as signals transmitted by UEs or other gNBs. The RF transceivers 372a-372n down-convert the incoming RF signals to generate IF or baseband signals. The IF or baseband signals are sent to the RX processing circuitry 376, which generates processed baseband signals by filtering, decoding, and/or digitizing the baseband or IF signals. The RX processing circuitry 376 transmits the processed baseband signals to the controller/processor 378 for further processing.

The TX processing circuitry 374 receives analog or digital data (such as voice data, web data, e-mail, or interactive video game data) from the controller/processor 378. The TX processing circuitry 374 encodes, multiplexes, and/or digitizes the outgoing baseband data to generate processed baseband or IF signals. The RF transceivers 372a-372n receive the outgoing processed baseband or IF signals from the TX processing circuitry 374 and up-converts the baseband or IF signals to RF signals that are transmitted via the antennas 370a-370n.

The controller/processor 378 can include one or more processors or other processing devices that control the overall operation of the gNB 102. For example, the controller/processor 378 can control the reception of forward channel signals and the transmission of reverse channel signals by the RF transceivers 372a-372n, the RX processing circuitry 376, and the TX processing circuitry 374 in accordance with well-known principles. The controller/processor 378 can support additional functions as well, such as more advanced wireless communication functions. In some embodiments, the controller/processor 378 includes at least one microprocessor or microcontroller.

The controller/processor 378 can execute programs and other processes resident in the memory 380, such as an OS. The controller/processor 378 can support channel quality measurement and reporting for systems having 2D antenna arrays as described in embodiments of the present disclosure. In some embodiments, the controller/processor 378 supports communications between entities, such as web RTC. The controller/processor 378 can move data into or out of the memory 380 as part of an executing process.

The controller/processor 378 is also coupled to the backhaul or network interface 382. The backhaul or network interface 382 allows the gNB 102 to communicate with other devices or systems over a backhaul connection or over a network. The backhaul or network interface 382 can support communications over any suitable wired or wireless connection(s). For example, when the gNB 102 is implemented as part of a cellular communication system (such as one supporting 5G or new radio access technology or NR, LTE, or LTE-A), the backhaul or network interface 382 can allow the gNB 102 to communicate with other gNBs over a wired or wireless backhaul connection. When the gNB 102 is implemented as an access point, the backhaul or network interface 382 can allow the gNB 102 to communicate over a wired or wireless local area network or over a wired or wireless connection to a larger network (such as the Internet). The backhaul or network interface 382 includes any suitable structure supporting communications over a wired or wireless connection, such as an Ethernet or RF transceiver.

The memory 380 is coupled to the controller/processor 378. The memory 380 can include at least one of a RAM, a Flash memory, or other ROM. In certain embodiments, a plurality of instructions, such as a BIS algorithm, is stored in memory. The plurality of instructions, when executed, can cause the controller/processor 378 to perform the BIS process and to decode a received signal after subtracting out at least one interfering signal determined by the BIS algorithm.

As described in more detail below, the transmit and receive paths of the gNB 102 (implemented using the RF transceivers 372a-372n, TX processing circuitry 374, and/or RX processing circuitry 376) transmits configuration information for low-latency beam selection to a UE.

Although FIG. 3B illustrates one example of a gNB 102, various changes can be made to FIG. 3B. For example, the gNB 102 can include any number of each component shown in FIG. 3A. As a particular example, an access point can include a number of backhaul or network interfaces 382, and the controller/processor 378 can support routing functions to route data between different network addresses. As another example, while shown as including a single instance of TX processing circuitry 374 and a single instance of RX processing circuitry 376, the gNB 102 can include multiple instances of each (such as one per RF transceiver).

Rel.13 LTE supports up to 16 CSI-RS antenna ports which enable a gNB to be equipped with a large number of antenna elements (such as 64 or 128). In this case, a plurality of antenna elements is mapped onto one CSI-RS port. Furthermore, up to 32 CSI-RS ports will be supported in Rel.14 LTE and Rel.15 NR. For next generation cellular systems such as 5G, it is expected that the maximum number of CSI-RS ports remain more or less the same.

Figure 4:
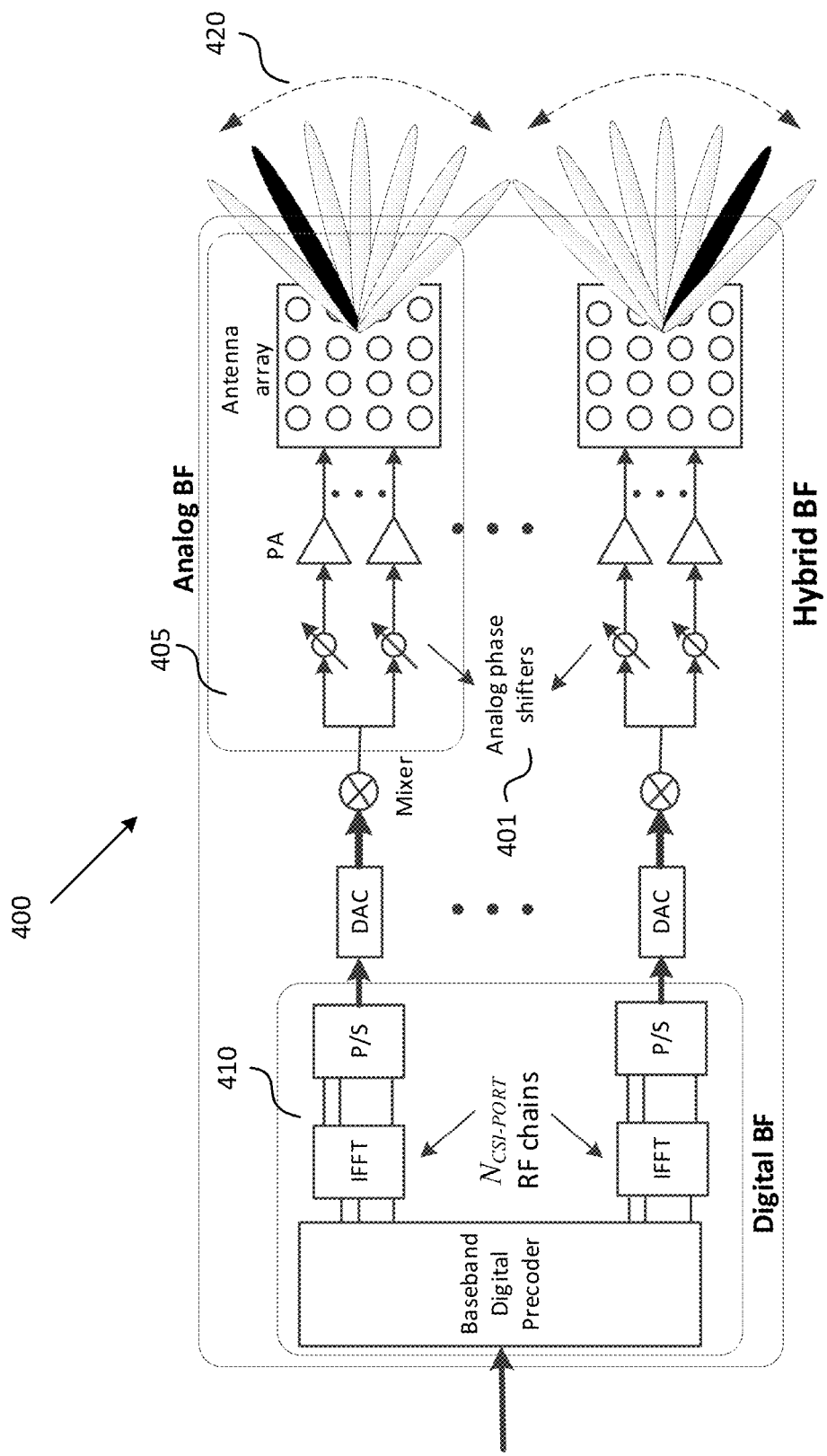
FIG. 4 illustrates an example beamforming architecture for a transmitter wherein one CSI-RS port is mapped onto a large number of analog-controlled antenna elements according to various embodiments of the present disclosure.

For mmWave bands, although the number of antenna elements can be larger for a given form factor, the number of CSI-RS ports—which can correspond to the number of digitally precoded ports—tends to be limited due to hardware constraints (such as the feasibility to install a large number of ADCs/DACs at mmWave frequencies) as illustrated by transmitter 400 of FIG. 4. For example, transmitter 400 may be present in the gNB 102 or the UE 116 of FIG. 1. The embodiment of the transmitter 400 shown in FIG. 4 is for illustration only, and other transmitters can have the same or similar configuration.

In the embodiment illustrated in FIG. 4, one CSI-RS port is mapped onto a large number of antenna elements which can be controlled by a bank of analog phase shifters 401. One CSI-RS port can then correspond to one sub-array which produces a narrow analog beam through analog beamforming 405. This analog beam can be configured to sweep across a wider range of angles 420 by varying the phase shifter bank across symbols or subframes or slots (wherein a subframe or a slot comprises a collection of symbols and/or can comprise a transmission time interval). The number of sub-arrays (equal to the number of RF chains) is the same as the number of CSI-RS ports $N_{CSI-PORT}$. A digital beamforming unit 410 performs a linear combination across $N_{CSI-PORT}$ analog beams to further increase precoding gain. While analog beams are wideband (hence not frequency-selective), digital precoding can be varied across frequency sub-bands or resource blocks. Receiver operation can be conceived analogously.

Since the above system utilizes multiple analog beams for transmission and reception (wherein one or a small number of analog beams are selected out of a large number, for instance, after a training duration—to be performed from time to time), the term "multi-beam operation" is used to refer to the overall system aspect. This includes, for the purpose of illustration, indicating the assigned DL or UL transmit (TX) beam (also termed "beam indication"), measuring at least one reference signal for calculating and performing beam reporting (also termed "beam measurement" and "beam reporting", respectively), and receiving a DL or UL transmission via a selection of a corresponding receive (RX) beam.

The above system is also applicable to higher frequency bands such as >52.6 GHz (also termed the FR4). In this case, the system can employ only analog beams. Due to the $O_2$ absorption loss around 60 GHz frequency (~10 dB additional loss @ 100 m distance), larger number of and sharper analog beams (hence larger number of radiators in the array) will be needed to compensate for the additional path loss.

In Rel.15 NR, multi-beam operation is designed primarily for single transmit-receive point (TRP) and single antenna panel. Therefore, the specification supports beam indication for one TX beam wherein a TX beam is associated with a reference RS. For DL beam indication and measurement, the reference RS can be NZP (non-zero power) CSI-RS and/or SSB (synchronization signal block, which includes primary synchronization signal, secondary synchronization signal, and PBCH). Here, DL beam indication is done via the transmission configuration indicator (TCI) field in DL-related DCI which includes an index to one (e.g., only one) assigned reference RS. For UL beam indication and measurement, the reference RS can be NZP CSI-RS, SSB, and/or SRS. Here, UL beam indication is done via the SRS resource indicator (SRI) field in UL-related DCI which is linked to one (e.g., only one) reference RS. This linkage is configured via higher-layer signaling using the SpatialRelationInfo RRC parameter. Essentially, only one TX beam may be indicated to the UE.

In Rel.15/16 NR, the most resource-efficient UL CSI/ beam measurement mechanism is aperiodic (equipped with AP SRS). On the other hand, with a well-chosen periodicity, periodic beam measurement (followed by SP) results in the lowest latency at the expense of resources. Although aperiodic beam reporting seems preferred from the overall operational perspective, in a few relevant scenarios the NW/gNB lacks knowledge on the UL channel condition especially UL interference—or, in other words, the UE may know the UL channel condition better. In this case, it is clearly beneficial if the UE can initiate UL beam measurement. For instance, when the UE is configured only with aperiodic UL beam measurement and the channel condition is worsened to the point of beam failure, the loss of link due to beam failure can be avoided if the UE can initiate aperiodic beam measurement without having to wait for a beam report (CSI) request/trigger from the NW/gNB.

Although UE-initiated UL beam measurement can be beneficial, efficient designs are needed to ensure that the latency is reduced and, at the same time, error events can be minimized.

Therefore, there is a need for efficient designs for UE-initiated SRS triggering to aid UL CSI acquisition and beam selection that can offer good trade-off between latency and reliability. There is also a need for efficient designs for UE-initiated UL CSI acquisition and UL beam selection (including UL beam indication) that can offer good trade-off between latency and reliability.

In the following, for brevity, both FDD and TDD are considered as the duplex method for both DL and UL signaling.

Although example descriptions and embodiments to follow assume orthogonal frequency division multiplexing (OFDM) or orthogonal frequency division multiple access (OFDMA), embodiments of the present disclosure can be extended to other OFDM-based transmission waveforms or multiple access schemes such as filtered OFDM (F-OFDM).

This disclosure of invention covers several components which can be used in conjunction or in combination with one another or can operate as standalone schemes.

In the present disclosure, the term "activation" describes an operation wherein a UE receives and decodes a signal from the network (or gNB) that signifies a starting point in time. The starting point can be a present or a future slot/subframe or symbol—the exact location either implicitly or explicitly indicated, or otherwise fixed or higher-layer configured. Upon successfully decoding the signal, the UE responds accordingly. The term "deactivation" describes an operation wherein a UE receives and decodes a signal from the network (or gNB) that signifies a stopping point in time. The stopping point can be a present or a future slot/subframe or symbol—the exact location either implicitly or explicitly indicated, or otherwise fixed or higher-layer configured. Upon successfully decoding the signal, the UE responds accordingly.

Terminology such as TCI, TCI states, SpatialRelationInfo, target RS, reference RS, and other terms is used for illustrative purposes and therefore not normative. Other terms that refer to the same functions can also be used.

Terminology such as UL TX beam is used for illustrative purposes and therefore not normative. Other terms such as UL transmit spatial filter, referring to a spatial filtering operation applied by the UE on a transmitted UL signal, can also be used to represent the same functions.

A "reference RS" corresponds to a set of characteristics of UL TX beam (or UL transmit spatial filter), such as direction, precoding/beamforming, number of ports, etc. For instance, as the UE receives a reference RS index/ID in an UL grant, the UE applies the known characteristics of the reference RS to the granted UL transmission. The reference RS can be received and measured by the UE (in this case, the reference RS is a downlink signal such as NZP CSI-RS and/or SSB) with the result of the measurement used for calculating a beam report. As the NW/gNB receives the beam report, the NW can be better equipped with information to assign a particular UL TX beam to the UE. Optionally, the reference RS can be transmitted by the UE (in this case, the reference RS is a downlink signal such as SRS or DMRS). As the NW/gNB receives the reference RS, the NW/gNB can measure and calculate the information to assign a particular UL TX beam to the UE.

The reference RS can be dynamically triggered by the NW/gNB (e.g. via DCI in case of AP RS), preconfigured with a certain time-domain behavior (such as periodicity and offset, in case of periodic RS), or a combination of such pre-configuration and activation/deactivation (in case of SP RS).

Beam reporting can be configured as CSI reporting with reporting metric for beam management switched ON. Some examples of beam management metric are L1-RSRP and L1-SINR (with various possible embodiments).

The following embodiment is an example of DL multi-beam operation that utilizes DL beam indication after the network (NW) receives some transmission from the UE. In the first example embodiment, AP CSI-RS is transmitted by the NW and measured by the UE. Although AP RS is used in these two examples, periodic or SP RS can also be used.

For mmWave (or FR2) or higher frequency bands (such as >52.6 GHz or FR4) where multi-beam operation is especially relevant, transmission-reception process includes the receiver to select a receive (RX) beam for a given TX beam.

For UL multi-beam operation, the gNB selects an UL RX beam for every UL TX beam (which corresponds to a reference RS). Therefore, when UL RS (such as SRS and/or DMRS) is used as reference RS, the NW/gNB triggers or configures the UE to transmit the UL RS (which is associated with a selection of UL TX beam). The gNB, upon receiving and measuring the UL RS, selects an UL RX beam. As a result, a TX-RX beam pair is derived. The NW/gNB can perform this operation for all the configured reference RS s (either per reference RS or "beam sweeping") and determine all the TX-RX beam pairs associated with all the reference RSs configured to the UE. On the other hand, when DL RS (such as CSI-RS and/or SSB) is used as reference RS (pertinent when DL-UL beam correspondence or reciprocity holds), the NW/gNB transmit the RS to the UE (for UL and by reciprocity, this corresponds to an UL RX beam). In response, the UE measures the reference RS (and in the process selects an UL TX beam) and reports the beam metric associated with the quality of the reference RS. In this case, the UE determines the TX-RX beam pair for every configured (DL) reference RS. Therefore, although this knowledge is unavailable to the NW/gNB, the UE—upon receiving a reference RS (hence UL RX beam) indication from the NW/gNB—can select the UL TX beam from the knowledge on all the TX-RX beam pairs.

In the present disclosure, the term "resource indicator," also abbreviated as REI, is used to refer to an indicator of RS resource used for signal/channel and/or interference measurement. This term is used for illustrative purposes and hence can be substituted with any other term that refers to the same function. Examples of REI include the aforementioned CSI-RS resource indicator (CRI) and SSB resource indicator (SSB-RI). Any other RS can also be used for signal/channel and/or interference measurement such as DMRS.

Figure 5A:
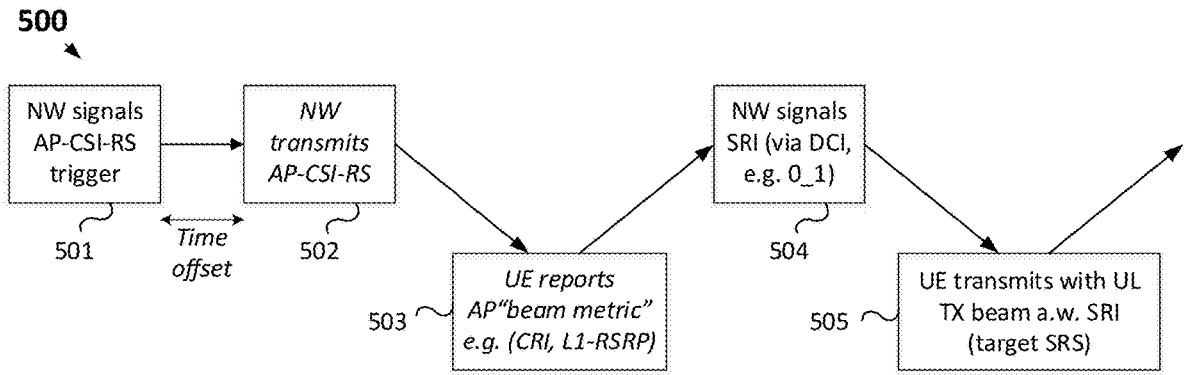
FIG. 5A illustrates a flow diagram of example aperiodic (AP) CSI-RS triggering and beam reporting according to one or more embodiments of the present disclosure.

In one example illustrated in FIG. 5A, an UL multi-beam operation 500 starts with the gNB/NW (e.g., gNB 102) signaling to a UE (e.g., UE 116) an AP CSI-RS trigger or indication (step 501). This trigger or indication can be included in a DCI (either UL-related or DL-related, either separately or jointly signaled with an AP CSI request/trigger) and indicate transmission of AP-CSI-RS in a same (zero time offset) or later slot/sub-frame (>0 time offset). Upon receiving the AP-CSI-RS transmitted by the gNB/NW (step 502), the UE measures the AP-CSI-RS and, in turn, calculates and reports a "beam metric" (indicating quality of a particular TX beam hypothesis) (step 503). Examples of such beam reporting are CSI-RS resource indicator (CRI) or SSB resource indicator (SSB-RI) coupled with its associated L1-RSRP/L1-RSRQ/L1-SINR/CQI. Upon receiving the beam report from the UE, the NW can use the beam report to select an UL TX beam for the UE and indicate the UL TX beam selection (step 504) using the SRI field in the UL-related DCI (that carries the UL grant, such as DCI format 0_1 in NR). The SRI corresponds to a "target" SRS resource that is linked to a reference RS (in this case, an AP-CSI-RS) via SpatialRelationInfo configuration. Upon successfully decoding the UL-related DCI with the SRI, the UE performs UL transmission (such as data transmission on PUSCH) with the UL TX beam associated with the SRI (step 505).

Figure 5B:
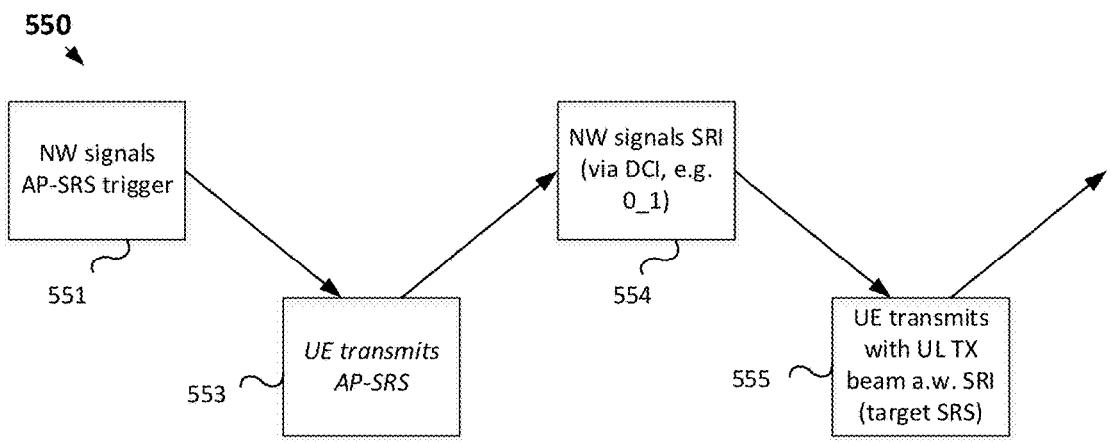
FIG. 5B illustrates a flow diagram of example AP SRS triggering according to one or more embodiments of the present disclosure.

In another example illustrated in FIG. 5B, an UL multi-beam operation 550 starts with the gNB/NW (e.g., gNB 102) signaling to a UE (e.g., UE 116) an AP-SRS trigger or request (step 551). This trigger can be included in a DCI (either UL-related or DL-related). Upon receiving and decoding the AP-SRS trigger (step 552), the UE transmits AP-SRS to the gNB/NW (step 553) so that the NW (or gNB)

can measure the UL propagation channel and select an UL TX beam for the UE. The gNB/NW can then indicate the UL TX beam selection (step 554) using the SRI field in the UL-related DCI (that carries the UL grant, such as DCI format 0_1 in NR). The SRI corresponds to a "target" SRS resource that is linked to a reference RS (in this case, an AP-SRS) via SpatialRelationInfo configuration. Upon successfully decoding the UL-related DCI with the SRI, the UE performs UL transmission (such as data transmission on PUSCH) with the UL TX beam associated with the SRI (step 555).

In the above two example embodiments, only one UL TX beam is indicated to the UE. Extension for multi panel UEs can be deduced by those familiar with the arts.

Figure 6:
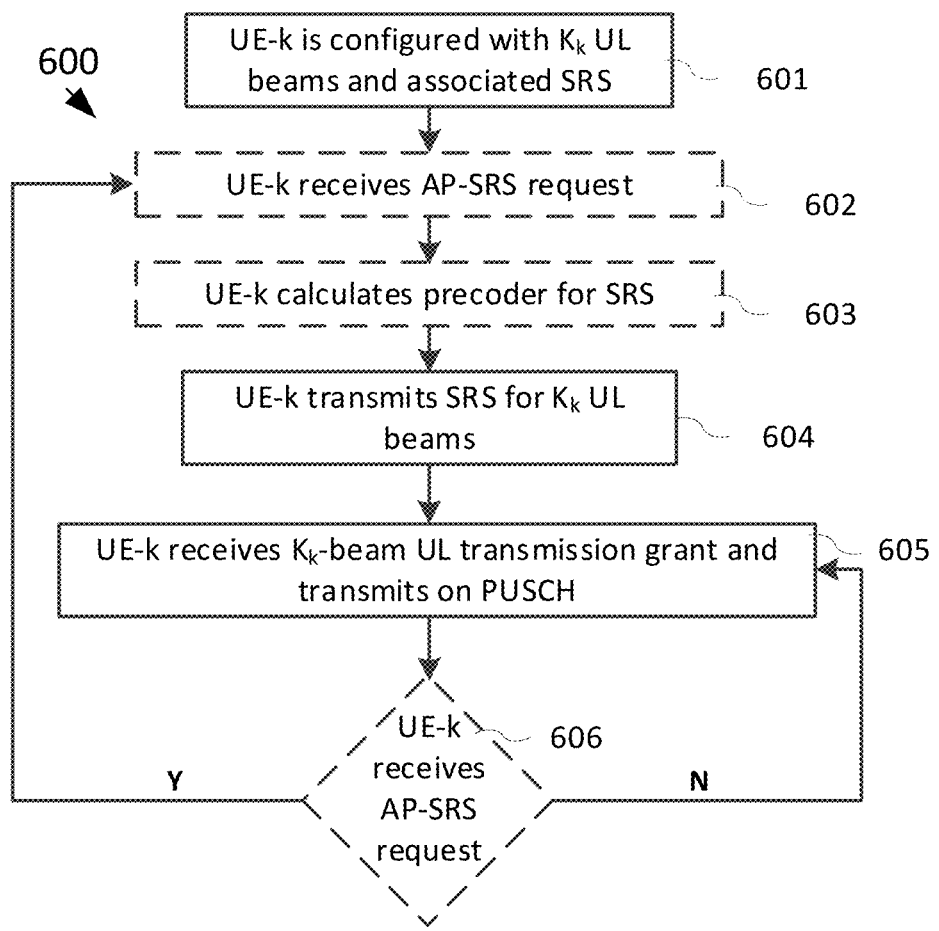
FIG. 6 illustrates a flowchart for an example uplink CSI acquisition according to one or more embodiments of the present disclosure.

An example embodiment for UL transmission can be illustrated in diagram 600 of FIG. 6 wherein UE-k (e.g., UE 116) is configured with $K_k$ UL beams and their associated SRS resources (or simply assignments—step 601). During the time when UE-k is connected to the network, UE-k can receive AP-SRS request from the network (step 602). Note that UE-k can also be configured with periodic SRS (P-SRS). If UE-k is configured with SP-SRS, in that case, SRS request is not applicable. But when an AP-SRS request is used, L1 DL control signaling (wherein the AP-SRS trigger/request is included in a DCI) can be utilized. If precoding is to be applied to form each of the UE-k SRS, UE-k can calculate the precoder for each of this SRS (step 603).

Subsequently, UE-k transmits the SRS for each of the $K_k$ beams (step 604). When UE-k receives an UL transmission grant on the $K_k$ beams, the UE can transmit its UL data on PUSCH (or an UL channel functionally analogous to PUSCH—step 605). The DCI associated with the UL transmission grant can include transmit PMI (TPMI) and/or transmit RI (TRI) associated with the $K_k$-beam transmission (analogous to $K_k$ beams—port transmission in NR). Optionally, UL beam selection can be performed via SRS resource/assignment indication (termed the SRI for illustrative purposes) that selects $N_k$ out of $K_k$ beams. This SRI can be accompanied with TPMI and/or TRI—associated with $N_k$ beams.

Steps 604 and 605 can be repeated until the network requests UE-k to transmit AP-SRS (when UE-k is configured with aperiodic SRS—step 606). If UE-k is configured with periodic SRS, steps 604 and 605 can simply be repeated. If UE-k is configured with SP SRS, steps 604 and 605 can be repeated until UE-k receives a deactivation command.

For the example embodiments depicted in FIGS. 5A, 5B, and 6, the gNB/NW (e.g., gNB 102) configures, dictates, and fully initiates the UL measurement (for UL TX/RX beams as well as UL CSI acquisition). In other words, the UE simply responds to the request/trigger signaled by the gNB/NW. In scenarios where the UE knows the UL transmission condition better than the NW (e.g. whether UL transmission on a certain spatial direction meets the requirements for maximum permissible exposure (MPE)), facilitating a UE-initiated or UE-triggered/initiated SRS transmission (by nature aperiodic) can be beneficial not only in terms of SRS resource/capacity utilization but also latency.

The present disclosure includes the following components which can be used in conjunction or in combination with one another or can operate as standalone schemes. A first component includes example embodiments for UE-initiated AP SRS triggering in relation to UL data/control transmission. A second component includes example embodiments for UE-initiated SRS triggering and SRRS transmission procedures. A third component includes example embodiments for UE-initiated UL beam selection. A fourth component includes example embodiments for UE-initiated UL beam indication.

Each of these components can be used either alone (without the other component) or in conjunction with at least one of the other components. Likewise, each of these components includes a plurality of sub-components. Each of the sub-components can be used either alone (without any other sub-component) or in conjunction with at least one of the other sub-components.

Figure 7:
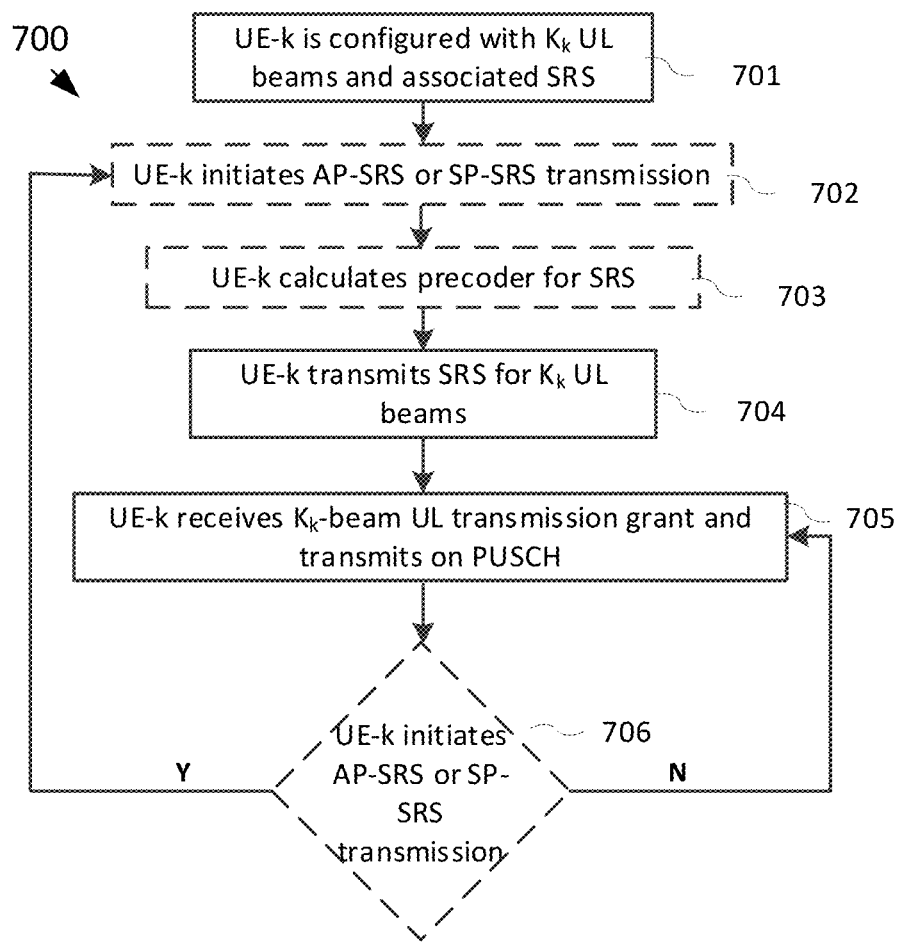
FIG. 7 illustrates a flowchart for an example of UL data and UE-initiated AP SRS transmission and according to one or more embodiments of the present disclosure.

For the first component (that is, UE-initiated AP SRS triggering), the use of UE-initiated or UE-triggered AP SRS transmission can be illustrated in an example flowchart 700 of FIG. 7 wherein UE-k (e.g., UE 116) is configured with $K_k$ UL beams and their associated SRS resources (or simply assignments—step 701). This configuration or assignment can be signaled to UE-k via higher-layer (e.g. RRC), MAC CE, or PDCCH (DCI). During the time when UE-k is connected to the network, UE-k can initiate or trigger AP-SRS (step 702). This is to be contrasted with UE-k simply responding to the request/trigger from the NW. Note that UE-k can also be configured with periodic SRS (P-SRS). If UE-k is configured with SP SRS, in that case, SRS request is not applicable. Instead, the request can be an activation signal. However, when an AP-SRS request is used, L1 DL control signaling (wherein the AP-SRS trigger/request is included in a DCI) can be utilized. If precoding is to be applied to form each of the UE-k SRS, UE-k can calculate the precoder for each of this SRS (step 703).

Subsequently, UE-k transmits the SRS for each of the $K_k$ beams (step 704). When UE-k receives an UL transmission grant on the $K_k$ beams, the UE can transmit its UL data (possibly accompanied and multiplexed with UCI) on PUSCH (or an UL channel functionally analogous to PUSCH—step 705). The DCI associated with the UL transmission grant can include transmit PMI (TPMI) and/or transmit RI (TRI) associated with the $K_k$-beam transmission (analogous to $K_k$ beams—port transmission in NR). Optionally, UL beam selection can be performed via SRS resource/assignment indication (termed the SRI for illustrative purposes) that selects $N_k$ out of $K_k$ beams. This SRI can be accompanied with TPMI and/or TRI—associated with $N_k$ beams.

Steps 704 and 705 can be repeated until UE-k initiates/triggers the transmission of AP SRS (when UE-k is configured with AP SRS—step 706). If UE-k is configured with periodic SRS, steps 704 and 705 can simply be repeated. If UE-k is configured with SP SRS, steps 704 and 705 can be repeated until UE-k initiatively deactivates the SRS transmission.

The UE can use at least one of various possible criteria to initiate/trigger (including activating/deactivating) SRS transmission. The criterion can be event-based as described further in another component of the present disclosure.

In the following example embodiments, at least one of the following goals can be used to design the scheme: 1) to enhance link reliability by reducing beam failure events; 2) to reduce overall latency of UL beam selection; 3) to reduce UL reporting overhead and SRS resource usage.

To attain at least one of those goals, the following potential issues need to be kept in mind: 1) susceptibility to error events, e.g. DTX (discontinuous transmission, that is, gNB failure to detect/decode), false alarm. Here, schemes that involve more steps tend to be more susceptible to error events; 2) increase in bursty UL interference (due to the altered statistics)

For the second component (that is, UE-initiated SRS triggering and SRRS transmission procedures), the following example embodiments include at least one method for UE-initiated SRS triggering and transmission. In relation to FIG. 7, this corresponds to step 702 and/or 706.

Figure 8A:
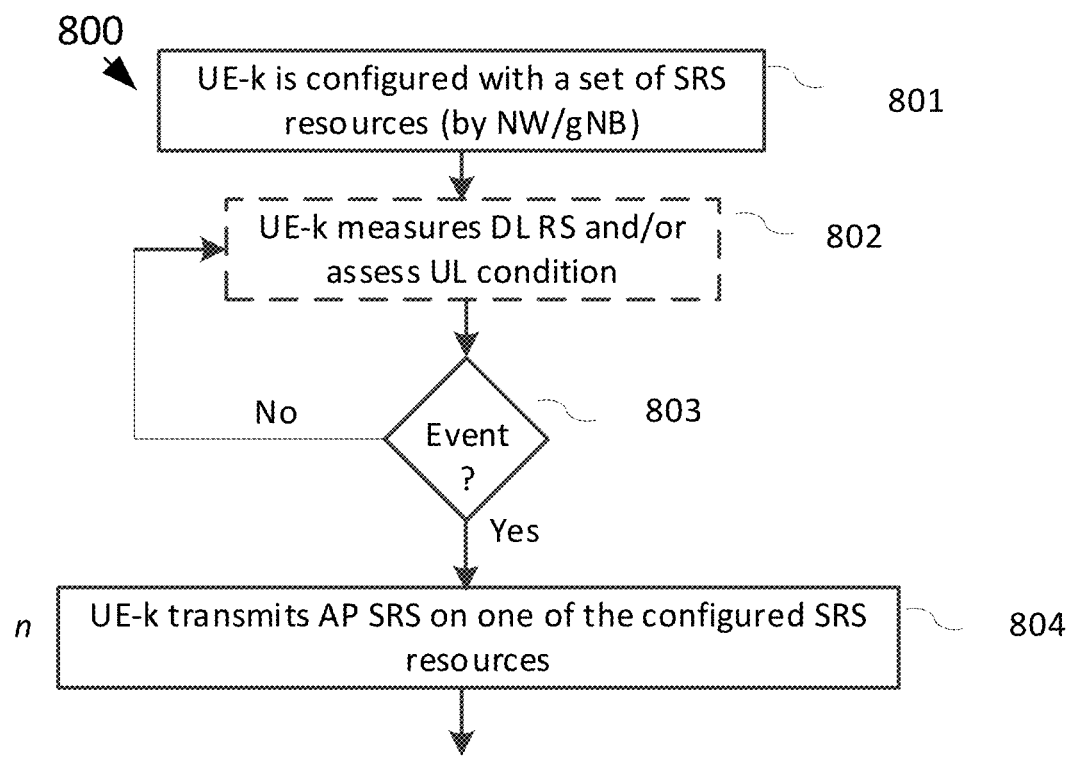
FIG. 8A illustrates a flowchart for an example of UE-initiated AP SRS transmission according to one or more embodiments of the present disclosure.

In one embodiment (II.1), as illustrated in flowchart 800 of FIG. 8A, UE-k (e.g., UE 116) is configured (by the NW/gNB) (e.g., gNB 102) with $N_k$ SRS resources (801). If SRS resource set is supported or used/configured, such resources can be partitioned into multiple SRS resource sets. This configuration can be performed via higher-layer (RRC) signaling. Alternatively, the NW/gNB can signal the set of reserved resources dynamically via L1 or L2 DL control (PDCCH or MAC CE). These resources will be used for transmitting the AP-SRS. In addition, UE-k can also be configured with at least one measurement RS resource such as CSI-RS (NZP and/or ZP CSI-RS), SSB, or other RS types such as SRS (e.g. if beam correspondence holds). The measurement R s are utilized to measure channel and/or beam quality such as CSI and/or beam metric. Depending on whether beam correspondence holds, the beam metric can represent UL link quality associated with data (PUSCH) and/or dedicated control (PUCCH). Examples of such metric include L1-RSRP, L1-SINR, CQI, or hypothetical BLER, possibly accompanied with at least one measurement RS resource index/indicator.

As UE-k measures the RS to calculate beam quality (802), the UE, based on the calculated beam quality and/or other criteria, determines if the UE initiates an AP-SRS triggering (803). One of the criteria can be event-based. For example, if the beam quality metric is less than or equal to a threshold Y, UE-k will initiate AP-SRS triggering. This threshold Y can be fixed, pre-determined, configured via higher-layer (RRC) signaling, or dynamically signaled to the UE (via, e.g. PDCCH or MAC CE). The event can correspond to one particular UL TX beam candidate, a subset of possible UL TX beam candidates, or all the UL TX beam candidates (wherein one UL TX beam candidate is associated with one of the configured measurement RS resources). This measurement can be taken in one slot or over multiple slots. The associated beam quality can correspond to beam metric such as L1-RSRP or L1-SINR measured on RS resources associated with data and/or control transmissions. It can also be associated with failure events such as beam failure detection (which represents the link used for PDCCH transmission). Another event can correspond to whether the hypothetical UL TX beam candidate (with a given TX power and/or UL transmission duty cycle) meets the MPE requirement(s). In this case, if beam correspondence holds, the strongest UL TX beam candidate that corresponds to the DL TX beam candidate with the highest DL beam metric may not meet the MPE requirement. In this case, the UE can initiate AP-SRS triggering for other UL TX beam candidates.

If the event is declared positive, the UE transmits the AP-SRS. This UE-initiated AP-SRS can be transmitted over at least one of the configured or reserved $N_k$ SRS resources in slot n (804). This AP-SRS transmission can also be accompanied with an indicator (e.g. transmitted over PUSCH or PUCCH) of the SRS resource used for the AP-SRS transmission. That is, at least one SRI can be transmitted to accompany the UE-initiated AP-SRS transmission. Optionally, no SRS resource indicator for this purpose is transmitted.

Note that on every slot (or possible set of slots, configured or predetermined) the NW/gNB determines whether the UE transmits an AP-SRS or not. Therefore, UE-k does not send any pre-reporting notification. Here, the UE can (autonomously) select a subset of the configured or reserved $N_k$ resources. There are at least several possibilities. First, if the AP-SRS transmission includes or is accompanied with an indication of the selected SRS resource(s) as described in previous paragraph, the gNB can infer the selected SRS resource(s) by decoding the companion SRI(s). Second, if the AP-SRS transmission does not include or is not accompanied with any indication of the selected SRS resource(s) but UE-k selects the resource(s) based on a pre-determined rule(s), the gNB can infer the selected SRS resource(s) from the rule(s). Third, if the AP-SRS transmission does not include any indication of the selected SRS resource(s) and UE-k 'randomly' selects the resource(s), the gNB may be required to perform blind decoding across the $N_k$ configured/reserved SRS resources. Such blind decoding involves first detecting the presence of AP-SRS. If the presence of AP-SRS is detected, the content of UCI can be decoded.

This embodiment results in the lowest latency since the AP-SRS transmission is performed in one step. However, missed detection or false alarm (on each of the $N_k$ hypotheses) can occur more frequently. Here, error detection mechanism to improve the energy-based detection can be beneficial.

Figure 8B:
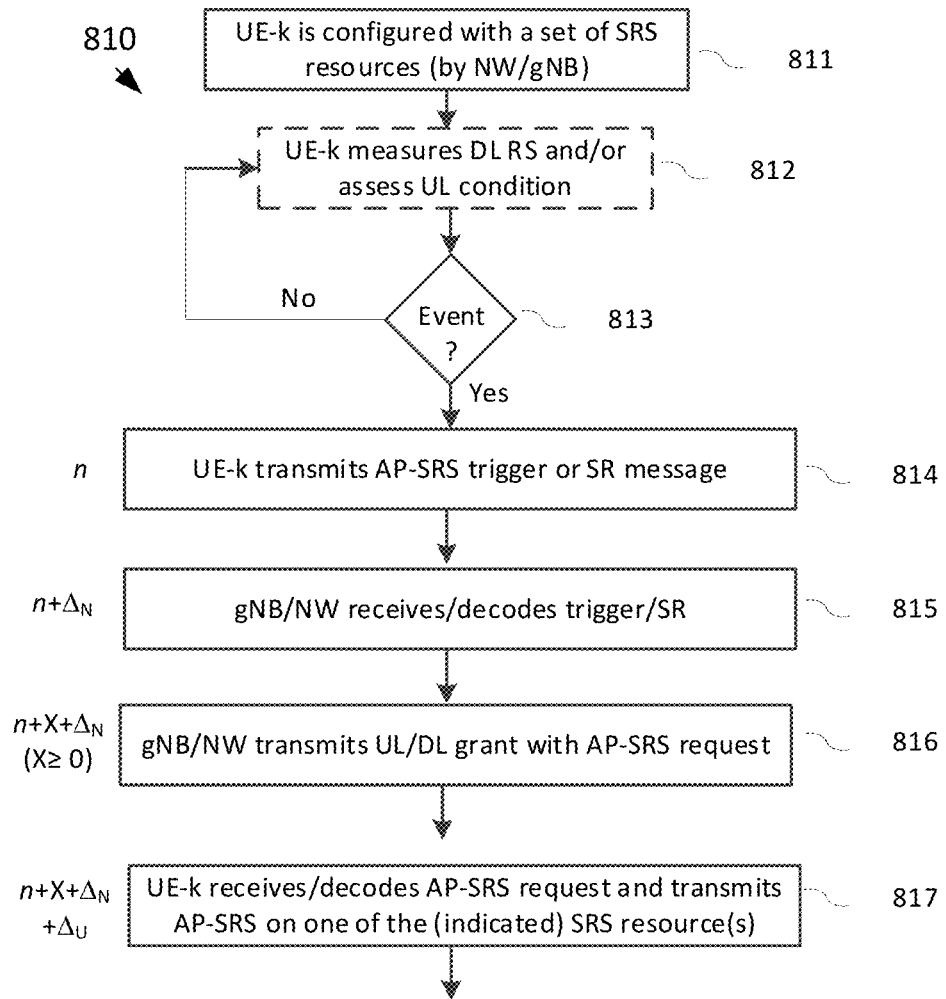
FIG. 8B illustrates a flowchart for an example of UE-initiated AP SRS transmission according to one or more embodiments of the present disclosure.

In another embodiment (II.2), as illustrated in flowchart 810 of FIG. 8B, UE-k (e.g., UE 116) is configured (by the NW/gNB (e.g., gNB 102)) with $N_k$ SRS resources (811). If SRS resource set is supported or used/configured, such resources can be partitioned into multiple SRS resource sets. This configuration can be performed via higher-layer (RRC) signaling. Alternatively, the NW/gNB can signal the set of reserved resources dynamically via L1 or L2 DL control (PDCCH or MAC CE). These resources will be used for transmitting the AP-SRS. In addition, UE-k can also be configured with at least one measurement RS resource such as CSI-RS (NZP and/or ZP CSI-RS), SSB, or other RS types such as SRS (e.g. if beam correspondence holds). The measurement RSs are utilized to measure channel and/or beam quality such as CSI and/or beam metric. Depending on whether beam correspondence holds, the beam metric can represent UL link quality associated with data (PUSCH) and/or dedicated control (PUCCH). Examples of such metric include L1-RSRP, L1-SINR, CQI, or hypothetical BLER, possibly accompanied with at least one measurement RS resource index/indicator.

As UE-k measures the RS to calculate beam quality (812), the UE, based on the calculated beam quality and/or other criteria, determines if the UE initiates an AP-SRS triggering (813). One of the criteria can be event-based. For example, if the beam quality metric is less than or equal to a threshold Y, UE-k will initiate AP-SRS triggering. This threshold Y can be fixed, pre-determined, configured via higher-layer (RRC) signaling, or dynamically signaled to the UE (via, e.g. PDCCH or MAC CE). The event can correspond to one particular UL TX beam candidate, a subset of possible UL TX beam candidates, or all the UL TX beam candidates (wherein one UL TX beam candidate is associated with one of the configured measurement RS resources). This measurement can be taken in one slot or over multiple slots. The associated beam quality can correspond to beam metric such as L1-RSRP or L1-SINR measured on RS resources associated with data and/or control transmissions. It can also be associated with failure events such as beam failure detection (which represents the link used for PDCCH transmission). Another event can correspond to whether the hypothetical UL TX beam candidate (with a given TX power and/or UL transmission duty cycle) meets the MPE requirement(s). In this case, if beam correspondence holds, the strongest UL TX beam candidate that corresponds to the DL TX beam candidate with the highest DL beam metric may not meet the MPE requirement. In this case, the UE can initiate AP-SRS triggering for other UL TX beam candidates.

If the event is declared positive, the UE first transmits a reporting trigger message to the NW/gNB to request for an UL/DL grant (which includes AP-SRS request) for transmitting the AP-SRS (step 814) in slot n. This could be analogous to Scheduling Request (SR). After the gNB/NW receives and decodes the reporting trigger message in slot n+$A_N$ (step 815), the gNB/NW transmits an UL/DL grant (e.g. on PDCCH) to the UE which includes AP-SRS request (step 816) in slot n+X+$\Delta_N$ where X is the additional processing time. As the UE receives and decodes the UL/DL grant, the UE transmits the AP-SRS on an SRS resource in slot n+X+$\Delta_N$+$\Delta_U$ (817).

Here, the UE can (e.g., autonomously) select a subset of the configured or reserved $N_k$ resources. There are at least several possibilities. First, if the AP-SRS transmission includes or is accompanied with an indication of the selected SRS resource(s) as described in the previous paragraph (step 814), the gNB can infer the selected SRS resource(s) by decoding the companion SRI(s) (step 815). Optionally, the indication of the selected SRS resource(s) can also be included in the UE reporting trigger or SR (step 814). In this case, the NW/gNB can follow the SRS resource selection from the UE without having to indicate the SRS resource(s) in the UL/DL grant, or the NW/gNB can still indicate the resource allocation for the SRS transmission in the UL/DL grant (this is beneficial if the SRS resource indication is not successfully received/decoded. Second, if the AP-SRS transmission does not include or is not accompanied with any indication of the selected SRS resource(s) but UE-k selects the resource(s) based on a pre-determined rule(s), the gNB can infer the selected SRS resource(s) from the rule(s). Third, if the AP-SRS transmission does not include any indication of the selected SRS resource(s) and UE-k 'randomly' selects the resource(s), the gNB may be required to perform blind decoding across the $N_k$ configured/reserved SRS resources. Such blind decoding involves first detecting the presence of AP-SRS. If the presence of AP-SRS is detected, the content of UCI can be decoded.

This embodiment does not require the NW/gNB to perform blind decoding thereby the least imposing one in terms of gNB baseband complexity. It is arguably the most efficient in terms of SRS resource. However, this embodiment results in increased latency (compared to II.1, the latency increases by X+$\Delta_N$+$\Delta_U$). In addition, since this embodiment involves more steps, it may be more prone to error events especially if the gNB/NW fails to correctly receive the SR, either due to first-order DTX/missed detection (lost reporting request/opportunity, which could further cause the UE to expect an UL/DL grant and thereby susceptible to a second-order false alarm) or first-order false alarm (which will cause increased DL interference, wasted SRS resource allocation). This is likely since SR typically lacks error detection capability. On the other hand, missed detection of UL is less likely since UL/DL grant is typically CRC protected.

Figure 8C:
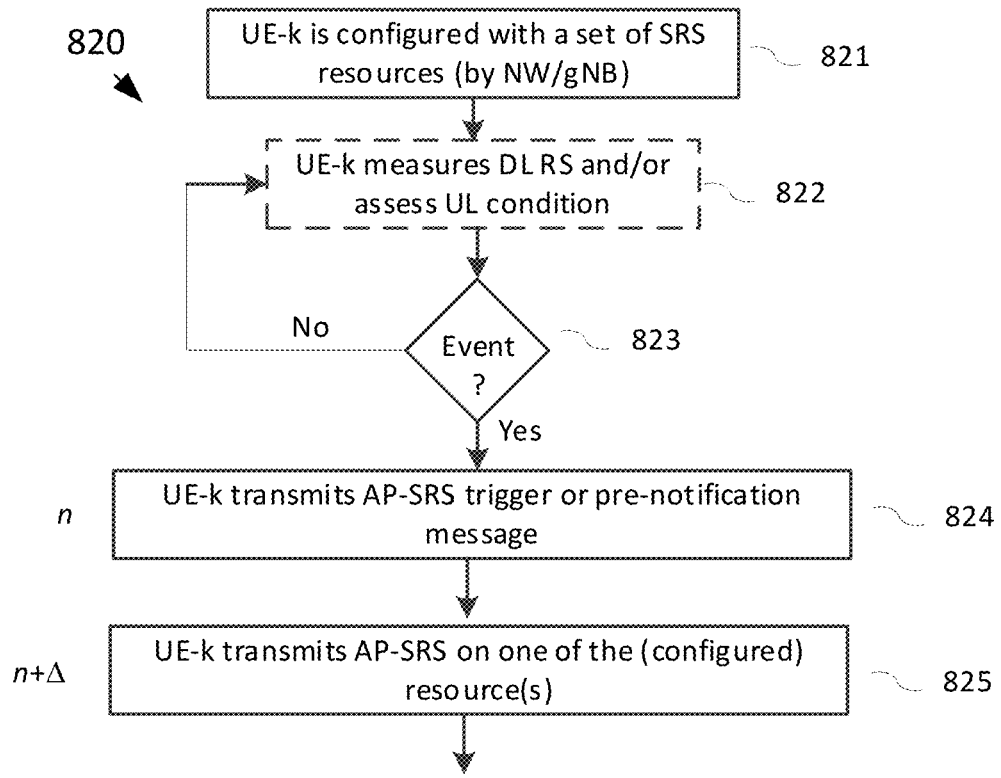
FIG. 8C illustrates a flowchart for an example of UE-initiated AP SRS transmission according to one or more embodiments of the present disclosure.

In another embodiment (II.3), as illustrated in flowchart 820 of FIG. 8C, UE-k (e.g., UE 116) is configured (by the NW/gNB (e.g., gNB 102)) with $N_k$ SRS resources (821). If SRS resource set is supported or used/configured, such resources can be partitioned into multiple SRS resource sets. This configuration can be performed via higher-layer (RRC) signaling. Alternatively, the NW/gNB can signal the set of reserved resources dynamically via L1 or L2 DL control (PDCCH or MAC CE). These resources will be used for transmitting the AP-SRS. In addition, UE-k can also be configured with at least one measurement RS resource such as CSI-RS (NZP and/or ZP CSI-RS), SSB, or other RS types such as SRS (e.g. if beam correspondence holds). The measurement RSs are utilized to measure channel and/or beam quality such as CSI and/or beam metric. Depending on whether beam correspondence holds, the beam metric can represent UL link quality associated with data (PUSCH) and/or dedicated control (PUCCH). Examples of such metric include L1-RSRP, L1-SINR, CQI, or hypothetical BLER, possibly accompanied with at least one measurement RS resource index/indicator.

As UE-k measures the RS to calculate beam quality (822), the UE, based on the calculated beam quality and/or other criteria, determines if the UE initiates an AP-SRS triggering (823). One of the criteria can be event-based. For example, if the beam quality metric is less than or equal to a threshold Y, UE-k will initiate AP-SRS triggering. This threshold Y can be fixed, pre-determined, configured via higher-layer (RRC) signaling, or dynamically signaled to the UE (via, e.g. PDCCH or MAC CE). The event can correspond to one particular UL TX beam candidate, a subset of possible UL TX beam candidates, or all the UL TX beam candidates (wherein one UL TX beam candidate is associated with one of the configured measurement RS resources). This measurement can be taken in one slot or over multiple slots. The associated beam quality can correspond to beam metric such as L1-RSRP or L1-SINR measured on RS resources associated with data and/or control transmissions. It can also be associated with failure events such as beam failure detection (which represents the link used for PDCCH transmission). Another event can correspond to whether the hypothetical UL TX beam candidate (with a given TX power and/or UL transmission duty cycle) meets the MPE requirement(s). In this case, if beam correspondence holds, the strongest UL TX beam candidate that corresponds to the DL TX beam candidate with the highest DL beam metric may not meet the MPE requirement. In this case, the UE can initiate AP-SRS triggering for other UL TX beam candidates.

If the event is declared positive, the UE first transmits a reporting trigger message or pre-notification message to the NW/gNB (step 824). However, unlike in embodiment II.2 where the message functions as a "scheduling request", this pre-notification message is transmitted as a notification to the NW/gNB that the UE is about to transmit an AP-SRS $\Delta$ slots later. That is, UE-k does not wait for an UL/DL grant to transmit the AP-SRS. It simply gives the NW/gNB sometime to receive and process (decode) the pre-notification message so that the NW/gNB is aware that the SRS transmission is coming. Optionally, the indication of the selected SRS resource(s) can also be included in the pre-notification message. The offset $\Delta$ can be pre-determined/fixed, configured via higher-layer (RRC) signaling, or signaled to UE-k via L1 (PDCCH, either UE-specific or UE-group DCI) or L2 (MAC CE) DL control channel. The pre-notification message can be transmitted on PUCCH (as a standalone message or multiplexed with other UCI or HARQ-ACK) or PUSCH (UCI-only or also multiplexed with data).

If the indication of the selected SRS resource(s) is not included in the pre-notification message, between slot n (transmission of pre-notification message) and n+$\Delta$ (transmission of AP beam/CSI reporting), UE-k can monitor PDCCH for the presence of an UL/DL grant with SRS resource allocation including any subset of the $N_k$ pre-configured SRS resources. Alternatively, the UE can simply check if that is the case only in slot (n+$\Delta$−1) or (n+$\Delta$). This is performed to see if any of the $N_k$ pre-configured SRS resources is used for other purposes, i.e. "grant-based" UCI and/or data transmission. By doing so, UE-k can select any subset of the $N_k$ pre-configured SRS resources that are free (unused) for the purpose of the UE-triggered/initiated AP-SRS transmission in slot n+Δ (step 825). In this case, UE-k can be expected to monitor the presence of UL/DL grant(s) for itself (i.e. whether the SRS resource(s) pre-configured for UE-k are used for other UEs should not concern UE-k and is left to the NW/gNB).

If the indication of the selected SRS resource(s) is included in the pre-notification message, UE-k can choose any from the $N_k$ pre-configured SRS resources. By doing so, if/when the NW/gNB receives the pre-notification message transmitted in slot n, the NW/gNB may know that the SRS resource(s) indicated in the pre-notification message cannot be used in any UL/DL grant for UE-k in slot n+Δ.

Here, the UE can (e.g., autonomously) select a subset of the configured or reserved $N_k$ resources. There are at least several possibilities. First, if the AP-SRS transmission includes or is accompanied with an indication of the selected SRS resource(s) as described in the previous paragraph (step 824), the gNB can infer the selected SRS resource(s) by decoding the companion SRI(s) (step 825). Or, optionally, if the indication of the selected SRS resource(s) is included in the pre-notification message, the gNB can infer the selected SRS resource(s) by decoding the pre-notification message. Second, if the SRS transmission does not include or is not accompanied with any indication of the selected SRS resource(s) but UE-k selects the resource(s) based on a set of fixed/pre-determined rule(s), the gNB can infer the selected SRS resource(s) from the rule(s). Third, if the AP-SRS transmission does not include any indication of the selected SRS resource(s) and UE-k 'randomly' selects the resource(s), the gNB may be required to perform blind decoding across the $N_k$ configured/reserved SRS resources. Such blind decoding involves first detecting the presence of UCI (via, e.g. CRC check) or the SRS itself. If the presence of UCI or AP-SRS is detected, the content of UCI can be decoded. Regarding the pool for SRS resource selection, the following possibilities exist. First, it can be done from all the pre-configured or reserved $N_k$ resources. Second, optionally, it can be done from a subset of the pre-configured or reserved $N_k$ resources not used in at least one UL grant as described in the previous paragraph, i.e. between slot n (transmission of pre-notification message) and n+Δ (transmission of AP beam/CSI reporting), or slot (n+Δ−1), or (n+Δ).

This embodiment may require the NW/gNB to perform blind decoding if the selected SRS resource is not indicated. In terms of latency and resource usage efficiency, it is in between embodiments II.1 and II.2. While this embodiment may not involve as many steps as embodiment II.3, it is still susceptible to missed detection and false alarm in decoding the trigger/pre-notification message.

For the above embodiments, the condition for transmitting AP-SRS transmission (steps 803, 813, or 823) is based on at least one measurement-based event. Other conditions can also be used. Optionally, the condition or event does not have to be specified. That is, the UE can initiate an AP-SRS by itself without any specified condition. This can be relevant if a number of different link/channel conditions are expected to warrant UE-initiated/triggered AP-SRS transmission.

For the above embodiments, the SRS transmission is assumed to be aperiodic wherein the UE transmits one SRS instance. Any of the above embodiments can also be extended to SP SRS (which involves activation and deactivation of the SP-SRS and, if SP CSI-RS is used, its corresponding measurements). Several options are possible. In a first option, when the condition for transmitting SP-SRS is fulfilled, the UE activates the SP-SRS transmission and, depending on the scheme, starts to transmit the SRS. At least one of the periodicity, slot offset, and/or the number of reporting instances can be either pre-determined/fixed, configured via higher-layer (RRC) signaling, or signaled to the UE via L1 (PDCCH, either UE-specific or UE-group DCI) or L2 (MAC CE) DL control channel. A second option is similar to the first option except that at least one of the periodicity, slot offset, and/or the number of reporting instances can be chosen by the UE and reported to the NW/gNB either separately or together with the SP-SRS. Therefore, the embodiments in FIGS. 8A, 8B, and 8C for AP-SRS can be extended to those illustrated in FIGS. 9A, 9B, and 9C, respectively, for SP SRS as follows. In any of the extension below, deactivation of SP-SRS is not shown. Here, deactivation can be accomplished either implicitly (e.g. via gNB/NW configuration and UE selection of the number of SRS transmission instances) or explicitly (the UE sending a deactivation request/notification to the gNB/NW which can be signaled separately or together with the SP-SRS).

Figure 9A:
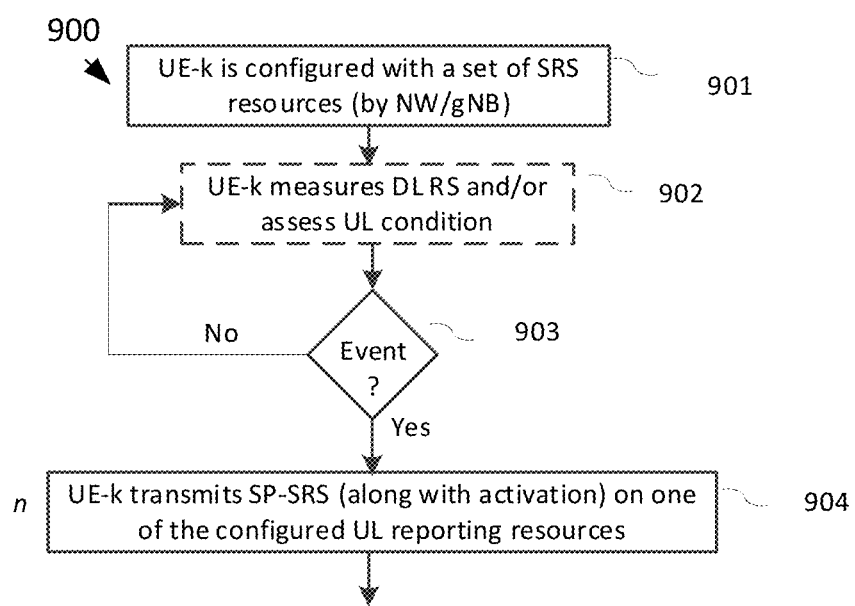
FIG. 9A illustrates a flowchart for an example of UE-initiated semi-persistent (SP) SRS transmission according to one or more embodiments of the present disclosure.

In one embodiment, as illustrated in flowchart 900 of FIG. 9A, UE-k (e.g., UE 116) is configured (by the NW/gNB) (e.g., gNB 102) with $N_k$ SRS resources (901). As UE-k measures the RS to calculate beam quality (902), the UE, based on the calculated beam quality and/or other criteria, determines if the UE initiates a SP-SRS triggering (903). If the event is declared positive, the UE transmits the SP-SRS. This UE-initiated SP-SRS can be transmitted (along with activation) over at least one of the configured or reserved $N_k$ SRS resources in slot n (904).

Figure 9B:
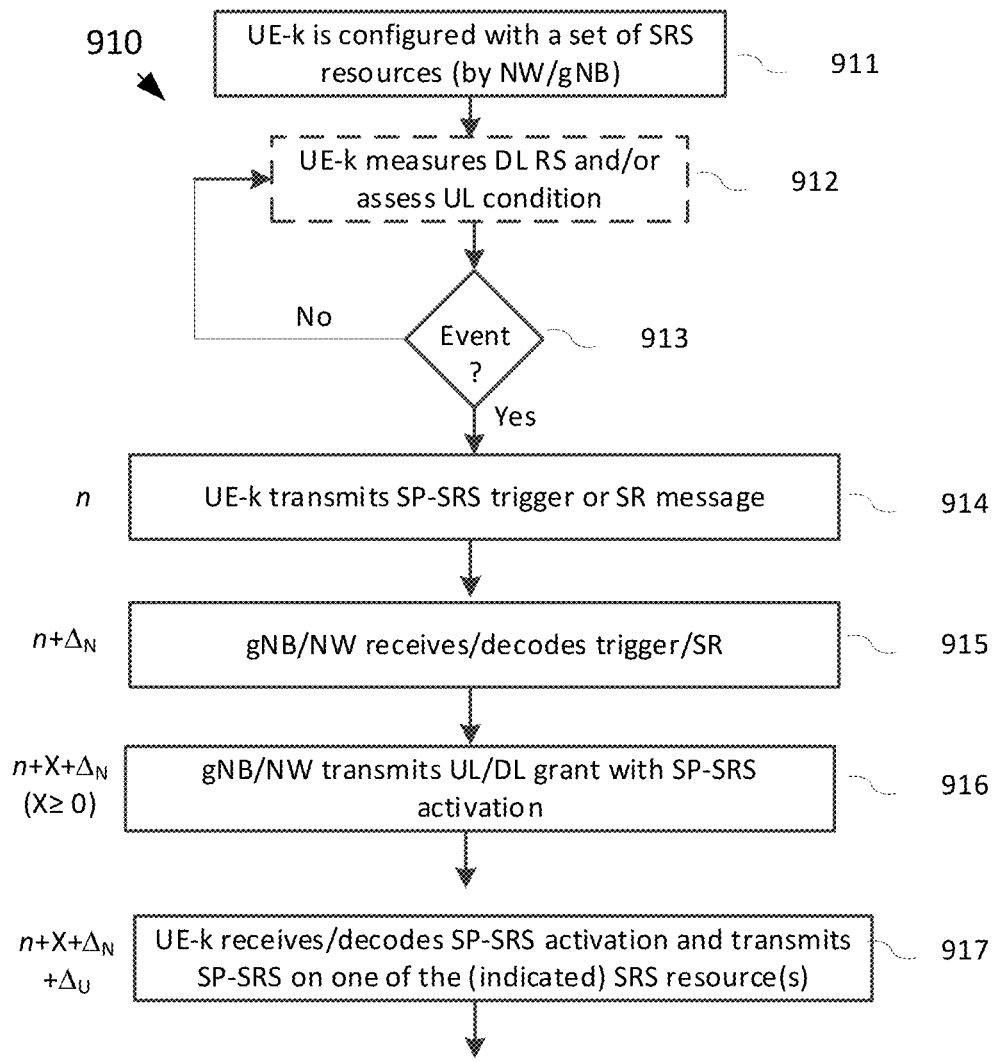
FIG. 9B illustrates a flowchart for an example of UE-initiated SP SRS transmission according to one or more embodiments of the present disclosure.

In another embodiment, as illustrated in flowchart 910 of FIG. 9B, UE-k (e.g., UE 116) is configured (by the NW/gNB (e.g., gNB 102)) with $N_k$ SRS resources (911). As UE-k measures the RS to calculate beam quality (912), the UE, based on the calculated beam quality and/or other criteria, determines if the UE initiates a SP-SRS triggering (913). If the event is declared positive, the UE first transmits a reporting trigger message to the NW/gNB to request for an UL/DL grant (which includes SP-SRS request) for transmitting the SP-SRS (step 914) in slot n. After the gNB/NW receives and decodes the reporting trigger message in slot n+$\Delta_N$ (step 915), the gNB/NW transmits an UL/DL grant (e.g. on PDCCH) to the UE which includes SP-SRS request (step 916) in slot n+X+$\Delta_N$ where X is the additional processing time. As the UE receives and decodes the UL/DL grant, the UE transmits the SP-SRS on an SRS resource in slot n+X+$\Delta_N$+$\Delta_U$ (917).

Here, the UE can (e.g., autonomously) select a subset of the configured or reserved $N_k$ resources. There are at least several possibilities. First, if the SP-SRS transmission includes or is accompanied with an indication of the selected SRS resource(s) as described above (step 914), the gNB can infer the selected SRS resource(s) by decoding the companion SRI(s) (step 915). Optionally, the indication of the selected SRS resource(s) can also be included in the UE reporting trigger or SR (step 914). In this case, the NW/gNB can follow the SRS resource selection from the UE without having to indicate the SRS resource(s) in the UL/DL grant, or the NW/gNB can still indicate the resource allocation for the SRS transmission in the UL/DL grant (this is beneficial if the SRS resource indication is not successfully received/decoded. Second, if the SP-SRS transmission does not include or is not accompanied with any indication of the selected SRS resource(s) but UE-k selects the resource(s) based on a pre-determined rule(s), the gNB can infer the selected SRS resource(s) from the rule(s). Third, if the SP-SRS transmission does not include any indication of the selected SRS resource(s) and UE-k 'randomly' selects the resource(s), the gNB may be required to perform blind decoding across the $N_k$ configured/reserved SRS resources. Such blind decoding involves first detecting the presence of SP-SRS. If the presence of SP-SRS is detected, the content of UCI can be decoded.

Figure 9C:
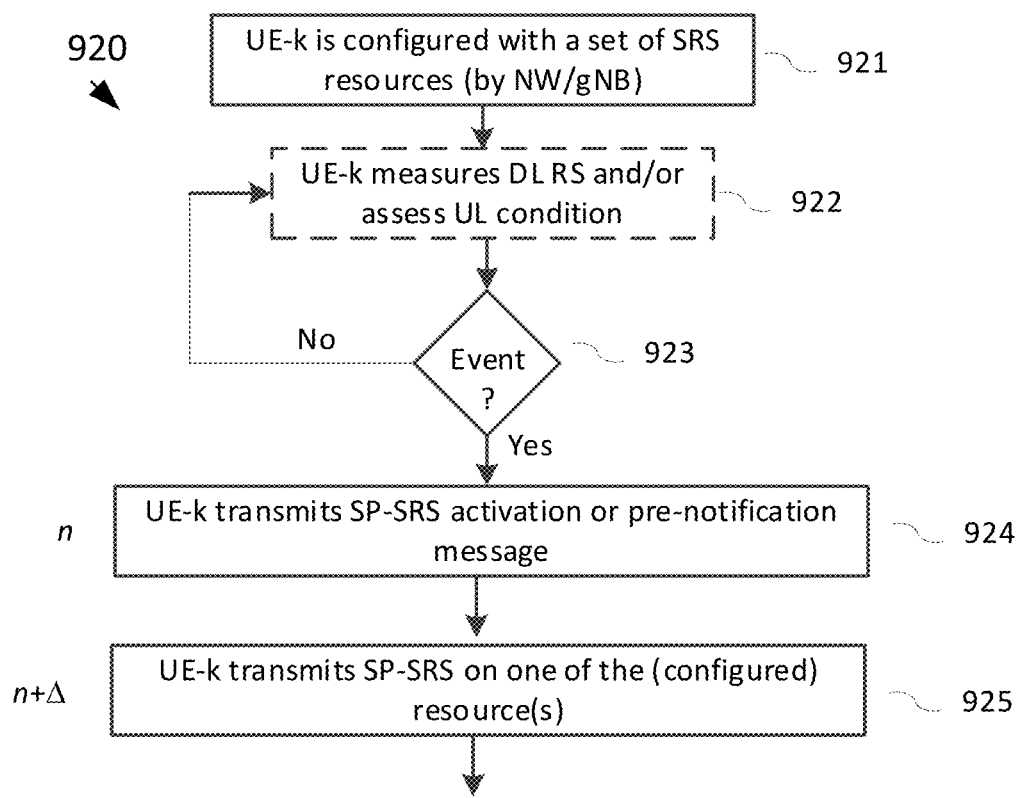
FIG. 9C illustrates a flowchart for an example of UE-initiated SP SRS transmission according to one or more embodiments of the present disclosure.

In another embodiment, as illustrated in flowchart 920 of FIG. 9C, UE-k (e.g., UE 116) is configured (by the NW/gNB (e.g., gNB 102)) with $N_k$ SRS resources (921). As UE-k measures the RS to calculate beam quality (922), the UE, based on the calculated beam quality and/or other criteria, determines if the UE initiates a SP-SRS triggering (923). If the event is declared positive, the UE first transmits a reporting trigger message or pre-notification message to the NW/gNB (step 924). If the indication of the selected SRS resource(s) is not included in the pre-notification message, between slot n (transmission of pre-notification message) and n+Δ (transmission of SP beam/CSI reporting), UE-k can monitor PDCCH for the presence of an UL/DL grant with SRS resource allocation including any subset of the $N_k$ pre-configured SRS resources. Alternatively, the UE can simply check if that is the case only in slot (n+Δ−1) or (n+Δ). This is performed to see if any of the $N_k$ pre-configured SRS resources is used for other purposes, i.e. "grant-based" UCI and/or data transmission. By doing so, UE-k can select any subset of the $N_k$ pre-configured SRS resources that are free (unused) for the purpose of the UE-triggered/initiated SP-SRS transmission in slot n+Δ (step 925). In this case, UE-k can be expected to monitor the presence of UL/DL grant(s) for itself (i.e. whether the SRS resource(s) pre-configured for UE-k are used for other UEs should not concern UE-k and is left to the NW/gNB). If the indication of the selected SRS resource(s) is included in the pre-notification message, UE-k can choose any from the $N_k$ pre-configured SRS resources. By doing so, if/when the NW/gNB receives the pre-notification message transmitted in slot n, the NW/gNB may know that the SRS resource(s) indicated in the pre-notification message cannot be used in any UL/DL grant for UE-k in slot n+Δ.

Here, the UE can (e.g., autonomously) select a subset of the configured or reserved $N_k$ resources. There are at least several possibilities. First, if the SP-SRS transmission includes or is accompanied with an indication of the selected SRS resource(s) as described above (step 924), the gNB can infer the selected SRS resource(s) by decoding the companion SRI(s) (step 925). Or, optionally, if the indication of the selected SRS resource(s) is included in the pre-notification message, the gNB can infer the selected SRS resource(s) by decoding the pre-notification message. Second, if the SRS transmission does not include or is not accompanied with any indication of the selected SRS resource(s) but UE-k selects the resource(s) based on a set of fixed/pre-determined rule(s), the gNB can infer the selected SRS resource(s) from the rule(s). Third, if the SP-SRS transmission does not include any indication of the selected SRS resource(s) and UE-k 'randomly' selects the resource(s), the gNB may be required to perform blind decoding across the $N_k$ configured/reserved SRS resources. Such blind decoding involves first detecting the presence of UCI (via, e.g. CRC check) or the SRS itself. If the presence of UCI or SP-SRS is detected, the content of UCI can be decoded. Regarding the pool for SRS resource selection, the following possibilities exist. First, it can be done from all the pre-configured or reserved $N_k$ resources. Second, optionally, it can be done from a subset of the pre-configured or reserved $N_k$ resources not used in at least one UL grant as described above, i.e. between slot n (transmission of pre-notification message) and n+Δ (transmission of SP beam/CSI reporting), or slot (n+Δ−1), or (n+Δ).

For the above embodiments, the condition for transmitting SP-SRS transmission (steps 903, 913, or 923) is based on at least one measurement-based event. Other conditions can also be used. Optionally, the condition or event does not have to be specified. That is, the UE can initiate a SP-SRS by itself without any specified condition. This can be relevant if a number of different link/channel conditions are expected to warrant UE-initiated/triggered SP-SRS transmission.

Figure 10:
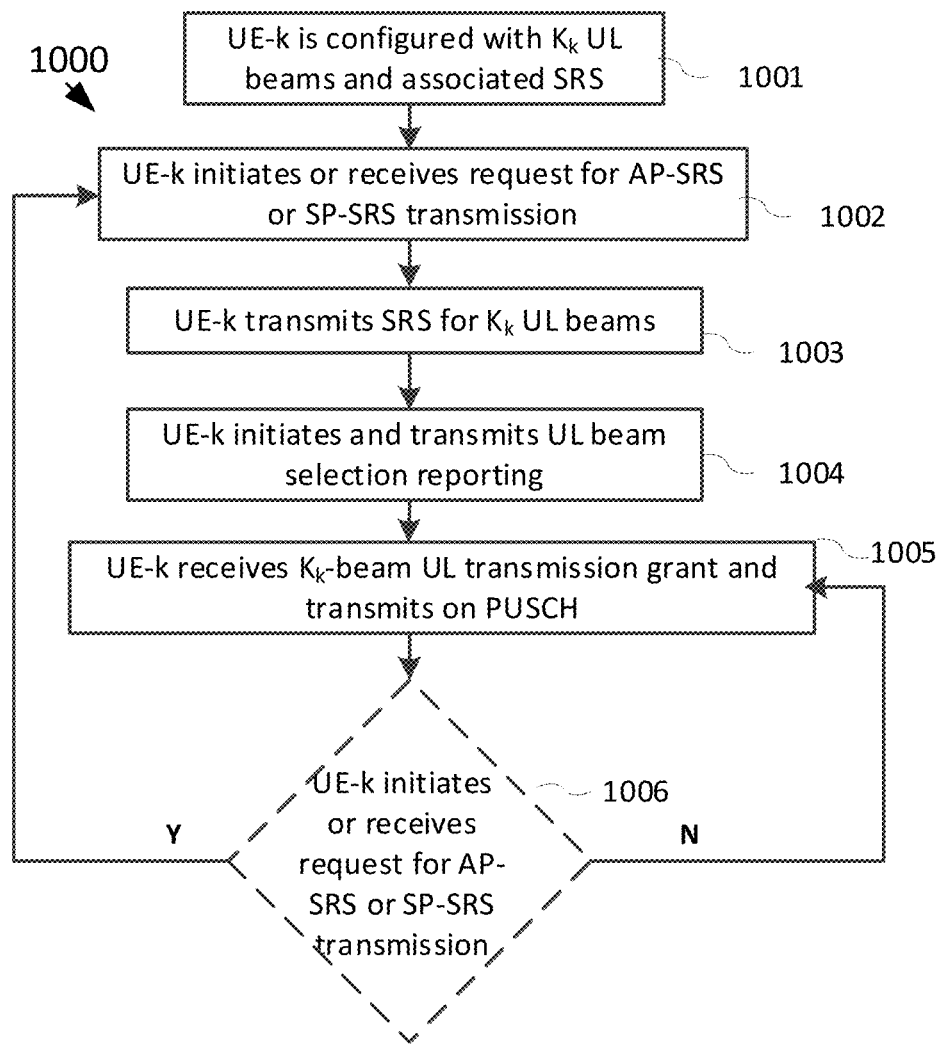
FIG. 10 illustrates a flowchart for an example of UE-initiated SRS and UL beam selection according to one or more embodiments of the present disclosure.

For the third component (that is, UE-initiated UL beam selection), the use of UE-initiated or UE-triggered UL beam selection can be illustrated in an example flowchart 1000 of FIG. 10 wherein UE-k (e.g., UE 116) is configured with $K_k$ UL beams and their associated SRS resources (or simply assignments—step 1001). This configuration or assignment can be signaled to UE-k via higher-layer (e.g. RRC), MAC CE, or PDCCH (DCI). During the time when UE-k is connected to the network, UE-k can either receive a request from the gNB/NW (e.g., gNB 102) or initiate/trigger AP-SRS (step 1002). Note that UE-k can also be configured with periodic SRS (P-SRS). If UE-k is configured with SP SRS, in that case, SRS request is not applicable. Instead, the request can be an activation signal. However, when an AP-SRS request is used, L1 DL control signaling (wherein the AP-SRS trigger/request is included in a DCI) can be utilized.

Subsequently, UE-k transmits the SRS for each or a subset of the $K_k$ beams (step 1003). Based on this SRS transmission, the gNB/NW transmits an UL beam indication to UE-k via an UL grant. Here, UL beam indication can be concurrent with (in the same DCI) or separate from (in a different DCI) the UL grant with the DCI associated with the UL grant. UE-k can in turn initiates and transmits UL beam selection reporting which serves as a recommendation to the gNB/NW (step 1004). The purpose of this reporting/recommendation is, for instance, to refine or replace (recommend an option different from the indicated UL beam) the latest UL beam indication received by the UE-k. Example embodiments for such reporting are described in Component 2 of the present disclosure.

When UE-k receives an UL transmission grant on the $K_k$ beams, the UE can transmit its UL data (possibly accompanied and multiplexed with UCI) on PUSCH (or an UL channel functionally analogous to PUSCH—step 1005). The DCI associated with the UL transmission grant can include transmit PMI (TPMI) and/or transmit RI (TRI) associated with the $K_k$-beam transmission (analogous to $K_k$ beams—port transmission in NR). Optionally, UL beam selection can be performed via SRS resource/assignment indication (termed the SRI for illustrative purposes) that selects $N_k$ out of $K_k$ beams. This SRI can be accompanied with TPMI and/or TRI—associated with $N_k$ beams.

Steps 1004 and 1005 can be repeated until UE-k initiates/triggers the transmission of AP-SRS (when UE-k is configured with AP-SRS—step 1006). If UE-k is configured with periodic SRS, steps 1004 and 1005 can simply be repeated. If UE-k is configured with SP SRS, steps 1004 and 1005 can be repeated until UE-k initiatively deactivates the SRS transmission.

The UE can use at least one of various possible criteria to initiate/trigger (including activating/deactivating) SRS transmission. The criterion can be event-based as described further in another component of the present disclosure.

In the following example embodiments, at least one of the following goals can be used to design the scheme: 1) to enhance link reliability by reducing beam failure events; 2) to reduce overall latency of UL beam selection; 3) to reduce UL reporting overhead and SRS resource usage.

To attain at least one of those goals, the following potential issues need to be kept in mind: 1) susceptibility to error events, e.g. DTX (gNB failure to detect/decode), false alarm. Here, schemes that involve more steps tend to be more susceptible to error events; 2) increase in bursty UL interference (due to the altered statistics).

For the fourth component (that is, UE-initiated UL beam indication), the following example embodiments include at least one method for UE-initiated UL beam indication. In relation to FIG. 10, this corresponds to step 1004.

As a shorthand and illustration for the present disclosure, "UBRI" will be used to represent "UL beam recommendation indication/indicator".

Figure 11A:
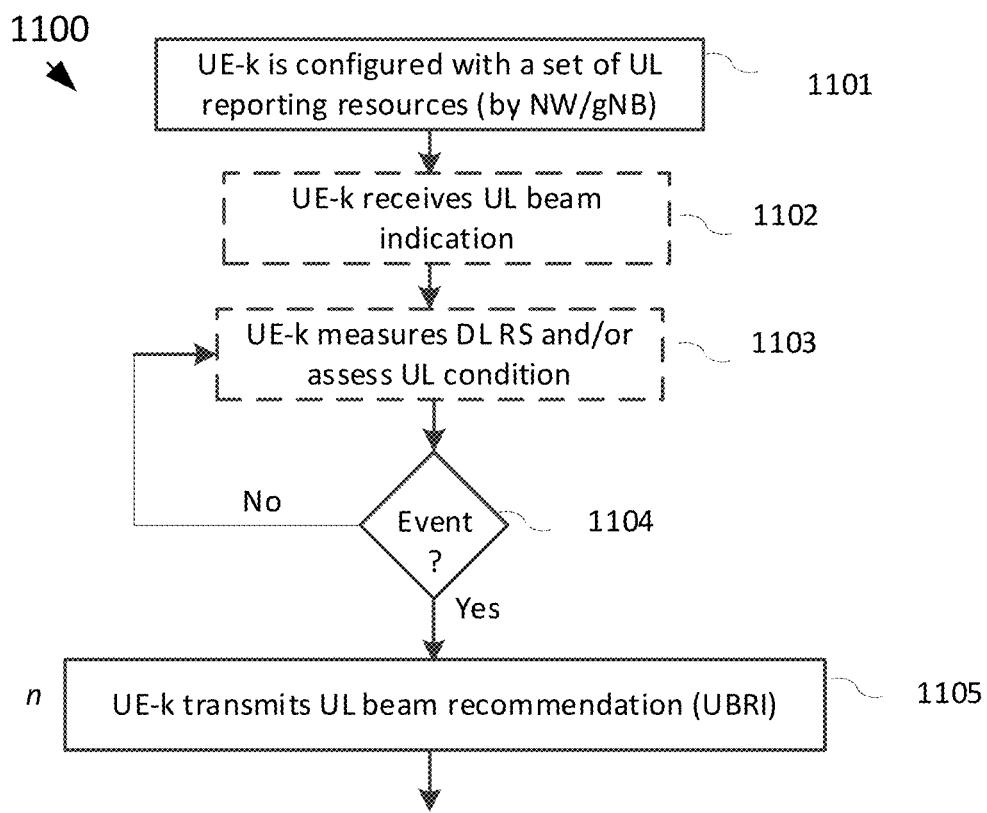
FIG. 11A illustrates a flowchart for an example of UE-initiated AP UL beam selection according to one or more embodiments of the present disclosure.

In one embodiment (IV.1), as illustrated in flowchart 1100 of FIG. 11A, UE-k (e.g., UE 116) is configured (by the NW/gNB (e.g., gNB 102)) with $N_k$ UL reporting resources (1101), either PUCCH resources, PUSCH resources, or a combination between PUCCH and PUSCH. This configuration can be performed via higher-layer (RRC) signaling. Alternatively, the NW/gNB can signal the set of reserved resources dynamically via L1 or L2 DL control (PDCCH or MAC CE). These resources will be used for transmitting the UBRI report. In addition, UE-k is also configured with at least one measurement RS resource such as CSI-RS (NZP and/or ZP CSI-RS), SSB, or other RS types such as SRS (e.g. if beam correspondence holds). The measurement RSs are utilized to measure channel and/or beam quality such as CSI and/or beam metric. The beam metric can represent link quality associated with data (PDSCH) and/or dedicated control (PDCCH). Examples of such metric include L1-RSRP, L1-SINR, CQI, or hypothetical BLER, possibly accompanied with at least one measurement RS resource index/indicator.

Subsequently UE-k can receive UL beam indication from the gNB/NW (for instance, via an UL-related DCI either with SRI or UL-TCI DCI field) (step 1102). This UL beam indication can be accompanied with or without an UL transmission grant (either data-only, data+UCI, or UCI-only). If accompanied with an UL grant, the UL beam indication can indicate the SRS resources (or resource sets) associated with the UL TX beams used for the granted UL transmission. It can also indicate the SRS resources (or resource sets) associated with the UL TX beams to be used for any future UL grant until the UE receives another UL beam indication. If not accompanied with an UL grant, the UL beam indication can indicate the SRS resources (or resource sets) associated with the UL TX beams to be used for any future UL grant until the UE receives another UL beam indication.

As UE-k measures the DL RS to calculate DL beam quality (1103), the UE, based on the calculated beam quality and/or other criteria, determines if the UE initiates transmission of UBRI reporting (1104). This DL beam quality can correspond (fully or partially) to UL condition especially when beam correspondence holds. One of the criteria can be event-based. For example, if the beam quality metric is less than or equal to a threshold Y, UE-k will initiate UBRI reporting. This threshold Y can be fixed, pre-determined, configured via higher-layer (RRC) signaling, or dynamically signaled to the UE (via, e.g. PDCCH or MAC CE). The event can correspond to one particular TX beam candidate, a subset of possible TX beam candidates, or all the TX beam candidates (wherein one TX beam candidate is associated with one of the configured measurement RS resources). This measurement can be taken in one slot or over multiple slots. The associated beam quality can correspond to beam metric such as L1-RSRP or L1-SINR measured on RS resources associated with data and/or control transmissions. It can also be associated with failure events such as beam failure detection (which represents the link used for PDCCH transmission). Another event can correspond to whether the hypothetical UL TX beam candidate (with a given TX power and/or UL transmission duty cycle) meets the MPE requirement(s). In this case, if beam correspondence holds, the strongest UL TX beam candidate that corresponds to the DL TX beam candidate with the highest DL beam metric may not meet the MPE requirement. In this case, the UE can recommend other UL TX beam candidates via UBRI reporting.

If the event is declared positive, the UE transmits the UBRI. This UBRI reporting can be transmitted over at least one of the configured or reserved $N_k$ resources (either on PUCCH, PUSCH, RACH, or a combination of any) in slot n (1105).

The procedure of measuring, determining UL channel condition, and/or checking if the event occurs can be performed each time when the UE receives an UL beam indication from the gNB/NW. Optionally, it can be performed multiple times (e.g. every slot or every other slot) between two occurrences of UL beam indication from the gNB/NW.

The UBRI includes a reference to at least one recommended UL TX beam candidate. This reference can include or be accompanied with at least one SRI (SRS resource indicator/indication), SRS resource set indicator/indication, reference RS (either SRS, CSI-RS, DMRS, or SSB) resource indicator, and/or a reference to an UL-TCI codepoint (associated with a configured UL-TCI state definition). In addition to information pertaining to UL TX beam candidate, the UBRI can also include an indicator of the selected UL reporting resource(s) used for UBRI transmission. Optionally, no UL reporting resource indicator for this purpose is transmitted.

Note that on every slot (or possible set of slots, configured or predetermined) the NW/gNB determines whether the UE transmits UBRI or not. Therefore, UE-k does not send any pre-reporting notification. Here, the UE can (autonomously) select a subset of the configured or reserved $N_k$ UL reporting resources. There are at least several possibilities. First, if the UBRI reporting includes or is accompanied with an indication of the selected UL reporting resource(s), the gNB can infer the selected UL reporting resource(s) by decoding the UBRI reporting. Second, if the UBRI reporting does not include (or is not accompanied with) any indication of the selected UL reporting resource(s) but UE-k selects the resource(s) based on a pre-determined rule(s), the gNB can infer the selected UL reporting resource(s) from the rule(s). Third, if the UBRI reporting does not include (or is not accompanied with) any indication of the selected UL reporting resource(s) and UE-k 'randomly' selects the resource(s), the gNB may be required to perform blind decoding across the $N_k$ configured/reserved UL reporting resources. Such blind decoding involves first detecting the presence of UCI (via, e.g. CRC check). If the presence of UCI is detected, the content of UCI can be decoded.

This embodiment results in the lowest latency since the UBRI reporting is performed in one step. However, missed detection or false alarm (on each of the $N_k$ hypotheses) can occur more frequently. Here, error detection mechanism is beneficial, e.g. CRC check on UCI (append CRC on UCI), or syndrome-based decoding for LDPC. Furthermore, it is beneficial to introduce a mechanism to differentiate UCI-only from UCI+data as well as data-only.

In addition, the configured UL reporting resources, whenever unused for UBRI reporting, can also be used for data transmission. In this case, content-dependent CRC (or content-dependent error detection mechanism, such as scrambling) can be used.

In the above description, it is assumed that the gNB/NW signals an UL beam indication to the UE and the UE responds by reporting UBRI, primarily as a recommendation to refine/reconsider/change the assigned UL TX beam(s), possibly in the next UL beam indication signaled to the UE. Optionally, the specification can facilitate a procedure for the UE to override the assigned UL TX beam(s) with the UL TX beam(s) indicated in the UBRI. In this case, the UE will use the UL TX beam(s) reported to the gNB/NW for the subsequent UL transmissions. In any case, the candidates for UL TX beams (for the UE to select for the purpose of UBRI reporting) can be configured via higher-layer (e.g. RRC) signaling, signaled to the UE via MAC CE, or UL/DL-related DCI (either using UE-specific or UE-group-specific DCI). This type of scheme can be considered UE-initiated/triggered.

Optionally, both the UE and the gNB/NW can cooperate in determining the UL TX beam(s). For example, the gNB/NW can signal a group of UL TX beam candidates for the UE to select. This group of UL TX beam candidates can be dynamically signaled via UL/DL-related DCI and can be signaled with or without any UL transmission grant. Whether accompanied with any UL transmission grant, the UL TX beam candidates can be signaled as a new DCI field or reuse the existing DCI fields (with different interpretation) such as SRI or UL-TCI (if supported). In this case, if accompanied with an UL transmission grant, the UE can assume the most recently selected UL TX beam(s) reported in the most recently reported UBRI. Subsequently, the UE, after receiving and decoding the UL TX beam candidate information, can select the UL TX beam(s) for subsequent UL transmissions and report the selection to the gNB/NW using a UBRI reporting. The UL TX beam(s) indicated in the UBRI reporting will be used for the subsequent UL transmissions until the next UBRI reporting is performed. Optionally, the specification can facilitate an override procedure by the gNB/NW wherein the gNB/NW signals/enforces an UL TX beam assignment to the UE after receiving a UBRI reporting. This override command (along with the enforced assignment) can be signaled in a same DCI field for the UL TX beam candidates (occupying different code points) or in a different DCI field.

Figure 11B:
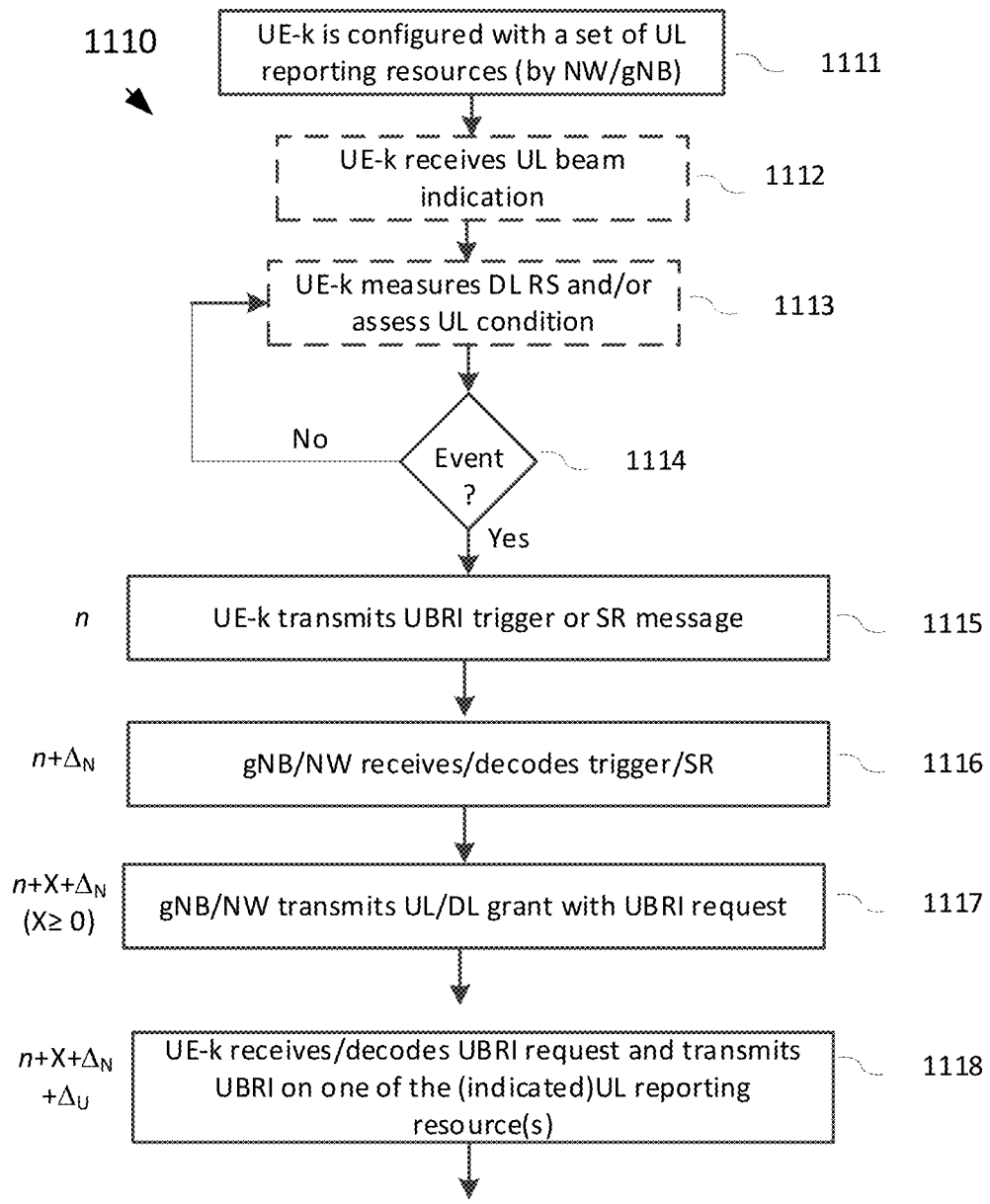
FIG. 11B illustrates a flowchart for an example of UE-initiated AP UL beam selection according to one or more embodiments of the present disclosure.

In another embodiment (IV.2), as illustrated in flowchart 1110 of FIG. 11B, UE-k (e.g., UE 116) is configured (by the NW/gNB (e.g., gNB 102)) with $N_k$ UL reporting resources (1111), either PUCCH resources, PUSCH resources, or a combination between PUCCH and PUSCH. This configuration can be performed via higher-layer (RRC) signaling. Alternatively, the NW/gNB can signal the set of reserved resources dynamically via L1 or L2 DL control (PDCCH or MAC CE). These resources will be used for transmitting the UBRI report. In addition, UE-k is also configured with at least one measurement RS resource such as CSI-RS (NZP and/or ZP CSI-RS), SSB, or other RS types such as SRS (e.g. if beam correspondence holds). The measurement RSs are utilized to measure channel and/or beam quality such as CSI and/or beam metric. The beam metric can represent link quality associated with data (PDSCH) and/or dedicated control (PDCCH). Examples of such metric include L1-RSRP, L1-SINR, CQI, or hypothetical BLER, possibly accompanied with at least one measurement RS resource index/indicator.

Subsequently UE-k can receive UL beam indication from the gNB/NW (for instance, via an UL-related DCI either with SRI or UL-TCI DCI field) (step 1112). This UL beam indication can be accompanied with or without an UL transmission grant (either data-only, data+UCI, or UCI-only). If accompanied with an UL grant, the UL beam indication can indicate the SRS resources (or resource sets) associated with the UL TX beams used for the granted UL transmission. It can also indicate the SRS resources (or resource sets) associated with the UL TX beams to be used for any future UL grant until the UE receives another UL beam indication. If not accompanied with an UL grant, the UL beam indication can indicate the SRS resources (or resource sets) associated with the UL TX beams to be used for any future UL grant until the UE receives another UL beam indication.

As UE-k measures the RS to calculate beam quality (1113), the UE, based on the calculated beam quality and/or other criteria, determines if the UE initiates transmission of UBRI reporting (1114). This DL beam quality can correspond (fully or partially) to UL condition especially when beam correspondence holds. One of the criteria can be event-based. For example, if the beam quality metric is less than or equal to a threshold Y, UE-k will initiate UBRI reporting. This threshold Y can be fixed, pre-determined, configured via higher-layer (RRC) signaling, or dynamically signaled to the UE (via, e.g. PDCCH or MAC CE). The event can correspond to one particular TX beam candidate, a subset of possible TX beam candidates, or all the TX beam candidates (wherein one TX beam candidate is associated with one of the configured measurement RS resources). This measurement can be taken in one slot or over multiple slots. The associated beam quality can correspond to beam metric such as L1-RSRP or L1-SINR measured on RS resources associated with data and/or control transmissions. It can also be associated with failure events such as beam failure detection (which represents the link used for PDCCH transmission). Another event can correspond to whether the hypothetical UL TX beam candidate (with a given TX power and/or UL transmission duty cycle) meets the MPE requirement(s). In this case, if beam correspondence holds, the strongest UL TX beam candidate that corresponds to the DL TX beam candidate with the highest DL beam metric may not meet the MPE requirement. In this case, the UE can recommend other UL TX beam candidates via UBRI reporting.

If the event is declared positive, the UE first transmits a reporting trigger message to the NW/gNB to request for an UL grant (which includes UBRI request) for transmitting the UBRI reporting (step 1115) in slot n. This could be analogous to Scheduling Request (SR). After the gNB/NW receives and decodes the reporting trigger message in slot n+$\Delta_N$ (step 1116), the gNB/NW transmits an UL grant (e.g. on PDCCH) to the UE which includes UBRI request {step 1117) in slot n+X+$\Delta_N$ where X is the additional processing time. As the UE receives and decodes the UL grant, the UE transmit the UBRI reporting on an UL reporting resource in slot n+X+$\Delta_N$+$\Delta_U$ (1118) (either on PUCCH, PUSCH, RACH, or a combination of any).

The procedure of measuring, determining UL channel condition, and/or checking if the event occurs can be performed each time when the UE receives an UL beam indication from the gNB/NW. Optionally, it can be performed multiple times (e.g. every slot or every other slot) between two occurrences of UL beam indication from the gNB/NW.

The UBRI includes a reference to at least one recommended UL TX beam candidate. This reference can include or be accompanied with at least one SRI (SRS resource indicator/indication), SRS resource set indicator/indication, reference RS (either SRS, CSI-RS, DMRS, or SSB) resource indicator, and/or a reference to an UL-TCI codepoint (associated with a configured UL-TCI state definition). In addition to information pertaining to UL TX beam candidate, the UBRI can also include an indicator of the selected UL reporting resource(s) used for UBRI transmission. Optionally, no UL reporting resource indicator for this purpose is transmitted.

Here, the UE can (autonomously) select a subset of the configured or reserved $N_k$ resources. There are at least several possibilities. First, if the UBRI reporting includes an indication of the selected UL reporting resource(s), the gNB can infer the selected UL reporting resource(s) by decoding the UBRI reporting. In this case, the NW/gNB can indicate the resource allocation for the UBRI reporting in the UL grant (step 1117). Optionally, the indication of the selected UL reporting resource(s) can also be included in the UE reporting trigger or SR (step 1115). In this case, the NW/gNB can follow the UL resource selection from the UE without having to indicate the UL reporting resource(s) in in the UL grant, or the NW/gNB can still indicate the resource allocation for the UBRI reporting in the UL grant (this is beneficial if the UL reporting resource indication is not successfully received/decoded. Second, if the UBRI reporting does not include any indication of the selected UL reporting resource(s) but UE-k selects the resource(s) based on a pre-determined rule(s), the gNB can infer the selected UL reporting resource(s) from the rule(s). Third, if the UBRI reporting does not include any indication of the selected UL reporting resource(s) and UE-k 'randomly' selects the resource(s), the gNB may be required to perform blind decoding across the $N_k$ configured/reserved UL reporting resources. Such blind decoding involves first detecting the presence of UCI (via, e.g. CRC check). If the presence of UCI is detected, the content of UCI can be decoded.

This embodiment does not require the NW/gNB to perform blind decoding thereby the least imposing one in terms of gNB baseband complexity. It is arguably the most efficient in terms of UL reporting resource. However, this embodiment results in increased latency (compared to I.1, the latency increases by $X+\Delta_N+\Delta_U$). In addition, since this embodiment involves more steps, it may be more prone to error events especially if the gNB/NW fails to correctly receive the SR, either due to first-order DTX/missed detection (lost reporting request/opportunity, which could further cause the UE to expect an UL grant and thereby susceptible to a second-order false alarm) or first-order false alarm (which will cause increased DL interference, wasted UL resource allocation). This is likely since SR typically lacks error detection capability. On the other hand, missed detection of UL is less likely since UL grant is typically CRC protected.

In the above description, it is assumed that the gNB/NW signals an UL beam indication to the UE and the UE responds by reporting UBRI, primarily as a recommendation to refine/reconsider/change the assigned UL TX beam(s), possibly in the next UL beam indication signaled to the UE. Optionally, the specification can facilitate a procedure for the UE to override the assigned UL TX beam(s) with the UL TX beam(s) indicated in the UBRI. In this case, the UE will use the UL TX beam(s) reported to the gNB/NW for the subsequent UL transmissions. In any case, the candidates for UL TX beams (for the UE to select for the purpose of UBRI reporting) can be configured via higher-layer (e.g. RRC) signaling, signaled to the UE via MAC CE, or UL/DL-related DCI (either using UE-specific or UE-group-specific DCI). This type of scheme can be considered UE-initiated/triggered.

Optionally, both the UE and the gNB/NW can cooperate in determining the UL TX beam(s). For example, the gNB/NW can signal a group of UL TX beam candidates for the UE to select. This group of UL TX beam candidates can be dynamically signaled via UL/DL-related DCI and can be signaled with or without any UL transmission grant. Whether accompanied with any UL transmission grant, the UL TX beam candidates can be signaled as a new DCI field or reuse the existing DCI fields (with different interpretation) such as SRI or UL-TCI (if supported). In this case, if accompanied with an UL transmission grant, the UE can assume the most recently selected UL TX beam(s) reported in the most recently reported UBRI. Subsequently, the UE, after receiving and decoding the UL TX beam candidate information, can select the UL TX beam(s) for subsequent UL transmissions and report the selection to the gNB/NW using a UBRI reporting. The UL TX beam(s) indicated in the UBRI reporting will be used for the subsequent UL transmissions until the next UBRI reporting is performed. Optionally, the specification can facilitate an override procedure by the gNB/NW wherein the gNB/NW signals/enforces an UL TX beam assignment to the UE after receiving a UBRI reporting. This override command (along with the enforced assignment) can be signaled in a same DCI field for the UL TX beam candidates (occupying different code points) or in a different DCI field.

Figure 11C:
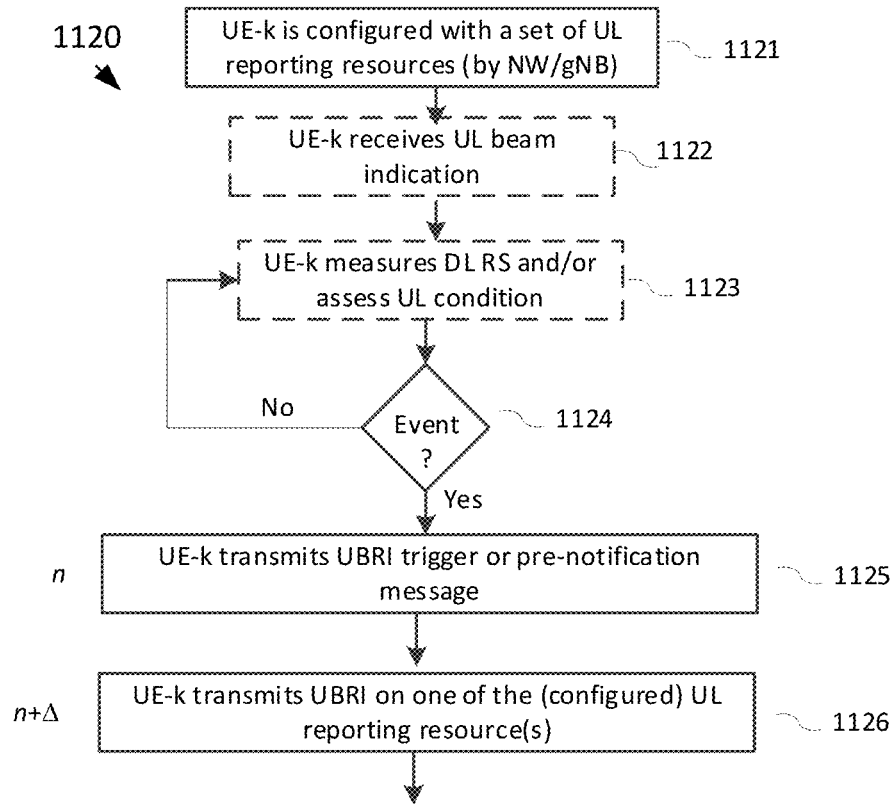
FIG. 11C illustrates a flowchart for an example of UE-initiated AP UL beam selection according to one or more embodiments of the present disclosure.

In another embodiment (IV.3), as illustrated in flowchart 1120 of FIG. 11C, UE-k (e.g., UE 116) is configured (by the NW/gNB (e.g., gNB 102)) with $N_k$ UL reporting resources (1121), either PUCCH resources, PUSCH resources, or a combination between PUCCH and PUSCH. This configuration can be performed via higher-layer (RRC) signaling. Alternatively, the NW/gNB can signal the set of reserved resources dynamically via L1 or L2 DL control (PDCCH or MAC CE). These resources will be used for transmitting the UBRI report. In addition, UE-k is also configured with at least one measurement RS resource such as CSI-RS (NZP and/or ZP CSI-RS), SSB, or other RS types such as SRS (e.g. if beam correspondence holds). The measurement RSs are utilized to measure channel and/or beam quality such as CSI and/or beam metric. The beam metric can represent link quality associated with data (PDSCH) and/or dedicated control (PDCCH). Examples of such metric include L1-RSRP, L1-SINR, CQI, or hypothetical BLER, possibly accompanied with at least one measurement RS resource index/indicator.

Subsequently UE-k can receive UL beam indication from the gNB/NW (for instance, via an UL-related DCI either with SRI or UL-TCI DCI field) (step 1122). This UL beam indication can be accompanied with or without an UL transmission grant (either data-only, data+UCI, or UCI-only). If accompanied with an UL grant, the UL beam indication can indicate the SRS resources (or resource sets) associated with the UL TX beams used for the granted UL transmission. It can also indicate the SRS resources (or resource sets) associated with the UL TX beams to be used for any future UL grant until the UE receives another UL beam indication. If not accompanied with an UL grant, the UL beam indication can indicate the SRS resources (or resource sets) associated with the UL TX beams to be used for any future UL grant until the UE receives another UL beam indication.

As UE-k measures the RS to calculate beam quality (1123), the UE, based on the calculated beam quality and/or other criteria, determines if the UE initiates transmission of UBRI reporting (1124). One of the criteria can be event-based. For example, if the beam quality metric is less than or equal to a threshold Y, UE-k will initiate UBRI reporting. This threshold Y can be fixed, pre-determined, configured via higher-layer (RRC) signaling, or dynamically signaled to the UE (via, e.g. PDCCH or MAC CE). The event can correspond to one particular TX beam candidate, a subset of possible TX beam candidates, or all the TX beam candidates (wherein one TX beam candidate is associated with one of the configured measurement RS resources). This measurement can be taken in one slot or over multiple slots. The associated beam quality can correspond to beam metric such as L1-RSRP or L1-SINR measured on RS resources associated with data and/or control transmissions. It can also be associated with failure events such as beam failure detection (which represents the link used for PDCCH transmission). Another event can correspond to whether the hypothetical UL TX beam candidate (with a given TX power and/or UL transmission duty cycle) meets the MPE requirement(s). In this case, if beam correspondence holds, the strongest UL TX beam candidate that corresponds to the DL TX beam candidate with the highest DL beam metric may not meet the MPE requirement. In this case, the UE can recommend other UL TX beam candidates via UBRI reporting.

If the event is declared positive, the UE first transmits a reporting trigger message or pre-notification message to the NW/gNB (step 1125). However, unlike in embodiment I.2 where the message functions as a "scheduling request", this pre-notification message is transmitted as a notification to the NW/gNB that the UE is about to transmit an AP UBRI reporting $\Delta$ slots later. That is, UE-k does not wait for an UL grant to transmit the AP UBRI reporting. It simply gives the NW/gNB sometime to receive and process (decode) the pre-notification message so that the NW/gNB is aware that the report is coming. Optionally, the indication of the selected UL reporting resource(s) can also be included in the pre-notification message. The offset $\Delta$ can be pre-determined/fixed, configured via higher-layer (RRC) signaling, or signaled to UE-k via L1 (PDCCH, either UE-specific or UE-group DCI) or L2 (MAC CE) DL control channel. The pre-notification message can be transmitted on PUCCH (as a standalone message or multiplexed with other UCI or HARQ-ACK) or PUSCH (UCI-only or also multiplexed with data).

The procedure of measuring, determining UL channel condition, and/or checking if the event occurs can be performed each time when the UE receives an UL beam indication from the gNB/NW. Optionally, it can be performed multiple times (e.g. every slot or every other slot) between two occurrences of UL beam indication from the gNB/NW.

The UBRI includes a reference to at least one recommended UL TX beam candidate. This reference can include or be accompanied with at least one SRI (SRS resource indicator/indication), SRS resource set indicator/indication, reference RS (either SRS, CSI-RS, DMRS, or SSB) resource indicator, and/or a reference to an UL-TCI codepoint (associated with a configured UL-TCI state definition). In addition to information pertaining to UL TX beam candidate, the UBRI can also include an indicator of the selected UL reporting resource(s) used for UBRI transmission. Optionally, no UL reporting resource indicator for this purpose is transmitted.

If the indication of the selected UL reporting resource(s) is not included in the pre-notification message, between slot n (transmission of pre-notification message) and n+$\Delta$ (transmission of AP UBRI reporting), UE-k can monitor PDCCH for the presence of an UL grant with resource allocation including any subset of the $N_k$ pre-configured UL reporting resources. Alternatively, the UE can simply check if that is the case only in slot (n+$\Delta$−1) or (n+$\Delta$). This is performed to see if any of the $N_k$ pre-configured UL reporting resources is used for other purposes, i.e. "grant-based" UCI and/or data transmission. By doing so, UE-k can select any subset of the $N_k$ pre-configured UL reporting resources that are free (unused) for the purpose of the UE-triggered/initiated AP UBRI reporting in slot n+$\Delta$ (step 1126). In this case, UE-k can be expected to monitor the presence of UL grant(s) for itself (i.e. whether the UL reporting resource(s) pre-configured for UE-k are used for other UEs should not concern UE-k and is left to the NW/gNB). Optionally, the UE can use the most recent indicated UL reporting resource(s) for transmitting the AP UBRI reporting.

If the indication of the selected UL reporting resource(s) is included in the pre-notification message, UE-k can choose any from the $N_k$ pre-configured UL reporting resources. By doing so, if/when the NW/gNB receives the pre-notification message transmitted in slot n, the NW/gNB may know that the UL reporting resource(s) indicated in the pre-notification message cannot be used in any UL grant for UE-k in slot n+$\Delta$.

Here, the UE can (e.g., autonomously) select a subset of the configured or reserved $N_k$ resources. There are at least several possibilities. First, if the AP UBRI reporting includes an indication of the selected UL reporting resource(s), the gNB can infer the selected UL reporting resource(s) by decoding the AP UBRI reporting. Or, optionally, if the indication of the selected UL reporting resource(s) is included in the pre-notification message, the gNB can infer the selected UL reporting resource(s) by decoding the pre-notification message. Second, if the AP UBRI reporting does not include any indication of the selected UL reporting resource(s) but UE-k selects the resource(s) based on a set of fixed/pre-determined rule(s), the gNB can infer the selected UL reporting resource(s) from the rule(s). Third, if the AP UBRI reporting does not include any indication of the selected UL reporting resource(s) and UE-k 'randomly' selects the resource(s), the gNB may be required to perform blind decoding across the $N_k$ configured/reserved UL reporting resources. Such blind decoding involves first detecting the presence of UCI (via, e.g. CRC check). If the presence of UCI is detected, the content of UCI can be decoded. Regarding the pool for UL reporting resource selection, the following possibilities exist. First, it can be done from all the pre-configured or reserved $N_k$ resources. Second, optionally, it can be done from a subset of the pre-configured or reserved $N_k$ resources not used in at least one UL grant as described in the previous paragraph, i.e. between slot n (transmission of pre-notification message) and n+$\Delta$ (transmission of AP UBRI reporting), or slot (n+$\Delta$−1), or (n+$\Delta$).

This embodiment may require the NW/gNB to perform blind decoding if the selected UL reporting resource is not indicated. In terms of latency and resource usage efficiency, it is in between embodiments IV.1 and IV.2. While it does not involve as many steps as embodiment IV.2, it is still susceptible to missed detection and false alarm in decoding the trigger/pre-notification message.

In the above description, it is assumed that the gNB/NW signals an UL beam indication to the UE and the UE responds by reporting UBRI, primarily as a recommendation to refine/reconsider/change the assigned UL TX beam(s), possibly in the next UL beam indication signaled to the UE. Optionally, the specification can facilitate a procedure for the UE to override the assigned UL TX beam(s) with the UL TX beam(s) indicated in the UBRI. In this case, the UE will use the UL TX beam(s) reported to the gNB/NW for the subsequent UL transmissions. In any case, the candidates for UL TX beams (for the UE to select for the purpose of UBRI reporting) can be configured via higher-layer (e.g. RRC) signaling, signaled to the UE via MAC CE, or UL/DL-related DCI (either using UE-specific or UE-group-specific DCI). This type of scheme can be considered UE-initiated/triggered.

Optionally, both the UE and the gNB/NW can cooperate in determining the UL TX beam(s). For example, the gNB/NW can signal a group of UL TX beam candidates for the UE to select. This group of UL TX beam candidates can be dynamically signaled via UL/DL-related DCI and can be signaled with or without any UL transmission grant. Whether accompanied with any UL transmission grant, the UL TX beam candidates can be signaled as a new DCI field or reuse the existing DCI fields (with different interpretation) such as SRI or UL-TCI (if supported). In this case, if accompanied with an UL transmission grant, the UE can assume the most recently selected UL TX beam(s) reported in the most recently reported UBRI. Subsequently, the UE, after receiving and decoding the UL TX beam candidate information, can select the UL TX beam(s) for subsequent UL transmissions and report the selection to the gNB/NW using a UBRI reporting. The UL TX beam(s) indicated in the UBRI reporting will be used for the subsequent UL transmissions until the next UBRI reporting is performed. Optionally, the specification can facilitate an override procedure by the gNB/NW wherein the gNB/NW signals/enforces an UL TX beam assignment to the UE after receiving a UBRI reporting. This override command (along with the enforced assignment) can be signaled in a same DCI field for the UL TX beam candidates (occupying different code points) or in a different DCI field.

For all the above embodiments, the condition for transmitting AP UBRI reporting (steps 1104, 1114, or 1124) is based on at least one measurement-based event. Other conditions can also be used. Optionally, the condition or event does not have to be specified. That is, the UE can initiate an AP UBRI reporting by itself without any specified condition. This can be relevant if a number of different link/channel conditions are expected to warrant UE-initiated/triggered AP UBRI reporting.

For all the above embodiments, the UBRI reporting is assumed to be aperiodic wherein the UE reports one reporting instance. Any of the above embodiments can also be extended to SP UBRII reporting (which involves activation and deactivation of the SP report and, if SP CSI-RS is used, its corresponding measurements). Several options are possible. In a first option, when the condition for transmitting SP UBRI reporting is fulfilled, the UE activates the SP UBRI reporting and, depending on the scheme, starts to transmit the report. At least one of the periodicity, slot offset, and/or the number of reporting instances can be either pre-determined/fixed, configured via higher-layer (RRC) signaling, or signaled to the UE via L1 (PDCCH, either UE-specific or UE-group DCI) or L2 (MAC CE) DL control channel. A second option is similar to the first option except that at least one of the periodicity, slot offset, and/or the number of reporting instances can be chosen by the UE and reported to the NW/gNB either separately or together with the SP UBRI reporting. Therefore, the embodiments in FIGS. 11A, 11B, and 11C for aperiodic reporting can be extended to those illustrated in FIGS. 12A, 12B, and 12C, respectively, for SP reporting as follows. In any of the extension below, deactivation of SP reporting is not shown. Here, deactivation can be accomplished either implicitly (e.g. via gNB/NW configuration and UE selection of the number of reporting instances) or explicitly (the UE sending a deactivation request/notification to the gNB/NW which can be signaled separately or together with the SP UBRI reporting). The SP UBRI reporting can be performed either via PUCCH, PUSCH, or a combination of the two.

Figure 12A:
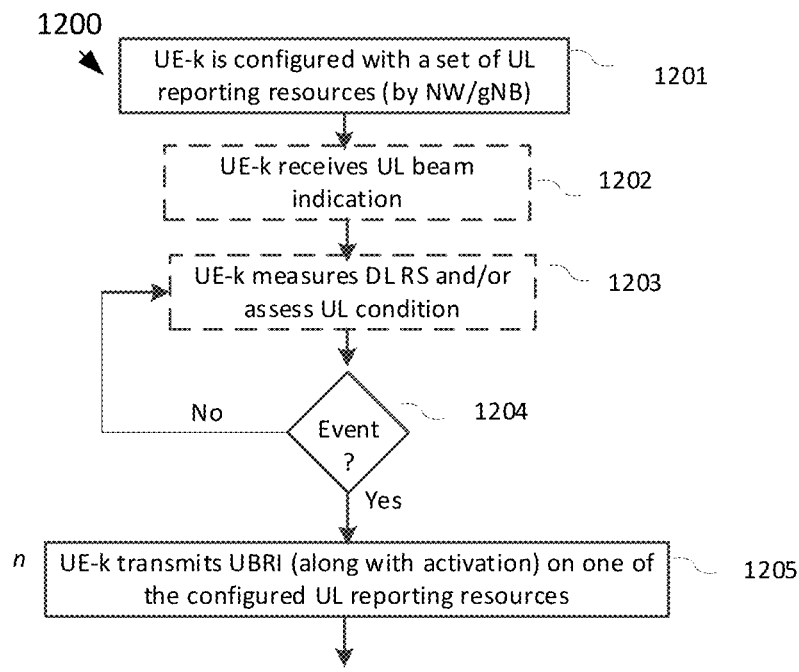
FIG. 12A illustrates a flowchart for an example of UE-initiated SP UL beam selection according to one or more embodiments of the present disclosure.

In particular, in one embodiment, as illustrated in flowchart 1200 of FIG. 12A, UE-k (e.g., UE 116) is configured (by the NW/gNB (e.g., gNB 102)) with $N_k$ UL reporting resources (1201), either PUCCH resources, PUSCH resources, or a combination between PUCCH and PUSCH. Subsequently UE-k can receive UL beam indication from the gNB/NW (for instance, via an UL-related DCI either with SRI or UL-TCI DCI field) (step 1202). As UE-k measures the DL RS to calculate DL beam quality (1203), the UE, based on the calculated beam quality and/or other criteria, determines if the UE initiates transmission of UBRI reporting (1204). If the event is declared positive, the UE transmits the UBRI. This UBRI reporting can be transmitted over at least one of the configured or reserved $N_k$ resources (either on PUCCH, PUSCH, RACH, or a combination of any) in slot n (step 1204).

Figure 12B:
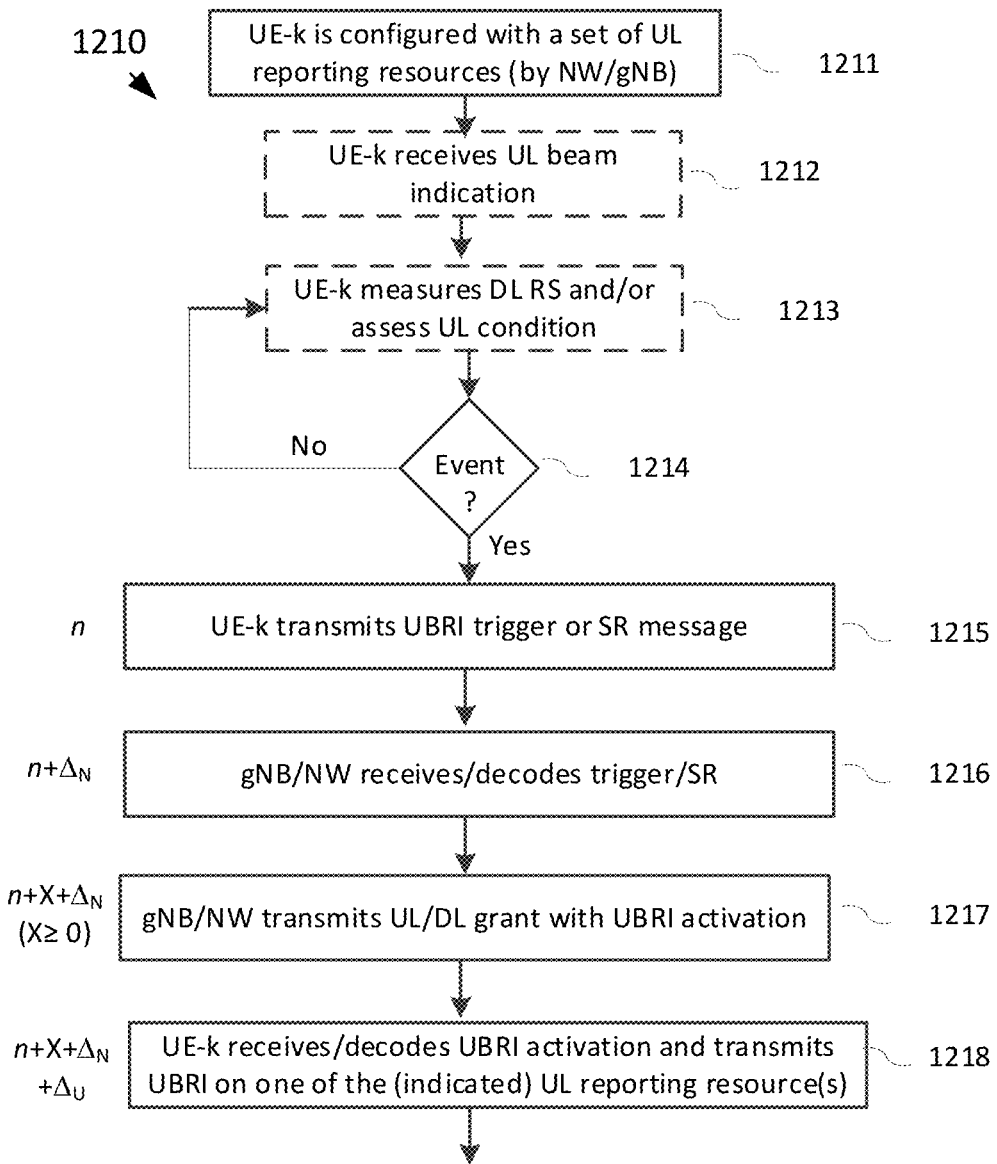
FIG. 12B illustrates a flowchart for an example of UE-initiated SP UL beam selection according to one or more embodiments of the present disclosure.

In another embodiment, as illustrated in flowchart 1210 of FIG. 12B, UE-k (e.g., UE 116) is configured (by the NW/gNB (e.g., gNB 102)) with $N_k$ UL reporting resources (1211), either PUCCH resources, PUSCH resources, or a combination between PUCCH and PUSCH. Subsequently UE-k can receive UL beam indication from the gNB/NW (for instance, via an UL-related DCI either with SRI or UL-TCI DCI field) (step 1212). As UE-k measures the RS to calculate beam quality (1213), the UE, based on the calculated beam quality and/or other criteria, determines if the UE initiates transmission of UBRI reporting (1214). If the event is declared positive, the UE first transmits a reporting trigger message to the NW/gNB to request for an UL grant (which includes UBRI request) for transmitting the UBRI reporting (step 1215) in slot n. This could be analogous to Scheduling Request (SR). After the gNB/NW receives and decodes the reporting trigger message in slot $n+\Delta_N$ (step 1216), the gNB/NW transmits an UL grant (e.g. on PDCCH) to the UE which includes UBRI request {step 1217) in slot $n+X+\Delta_N$ where X is the additional processing time. As the UE receives and decodes the UL grant, the UE transmit the UBRI reporting on an UL reporting resource in slot $n+X+\Delta_N+\Delta_U$ (1218) (either on PUCCH, PUSCH, RACH, or a combination of any).

Here, the UE can (autonomously) select a subset of the configured or reserved $N_k$ resources. There are at least several possibilities. First, if the UBRI reporting includes an indication of the selected UL reporting resource(s), the gNB can infer the selected UL reporting resource(s) by decoding the UBRI reporting. In this case, the NW/gNB can indicate the resource allocation for the UBRI reporting in the UL grant (step 1217). Optionally, the indication of the selected UL reporting resource(s) can also be included in the UE reporting trigger or SR (step 1215).

Figure 12C:
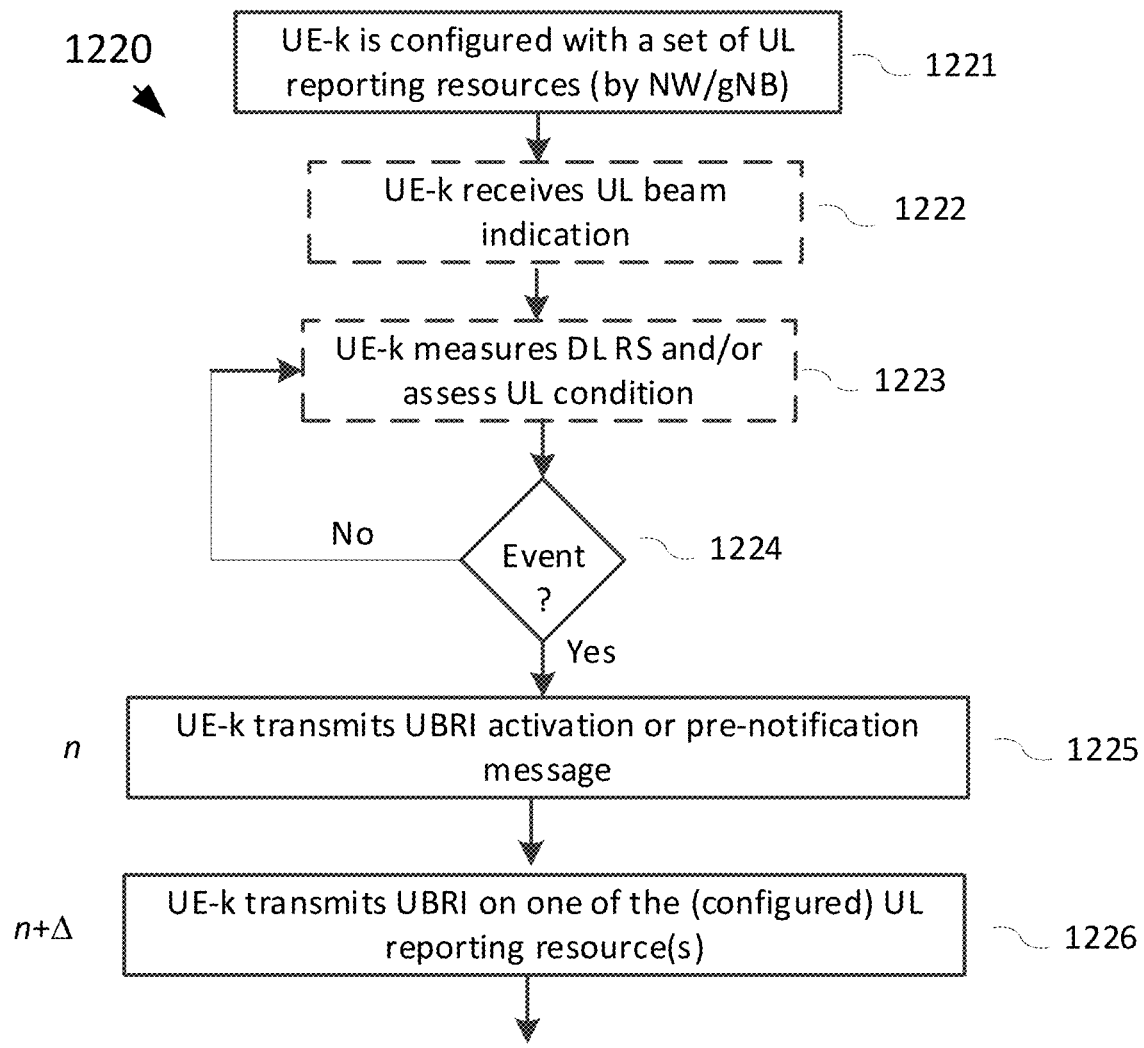
FIG. 12C illustrates a flowchart for an example of UE-initiated SP UL beam selection according to one or more embodiments of the present disclosure.

In another embodiment, as illustrated in flowchart 1220 of FIG. 12C, UE-k (e.g., UE 116) is configured (by the NW/gNB (e.g., gNB 102)) with $N_k$ UL reporting resources (1221), either PUCCH resources, PUSCH resources, or a combination between PUCCH and PUSCH. Subsequently UE-k can receive UL beam indication from the gNB/NW (for instance, via an UL-related DCI either with SRI or UL-TCI DCI field) (step 1222). As UE-k measures the RS to calculate beam quality (1223), the UE, based on the calculated beam quality and/or other criteria, determines if the UE initiates transmission of UBRI reporting (1224). If the event is declared positive, the UE first transmits a reporting trigger message or pre-notification message to the NW/gNB (step 1225).

If the indication of the selected UL reporting resource(s) is not included in the pre-notification message, between slot n (transmission of pre-notification message) and n+Δ (transmission of SP UBRI reporting), UE-k can monitor PDCCH for the presence of an UL grant with resource allocation including any subset of the $N_k$ pre-configured UL reporting resources. Alternatively, the UE can simply check if that is the case only in slot (n+Δ−1) or (n+Δ). This is performed to see if any of the $N_k$ pre-configured UL reporting resources is used for other purposes, i.e. "grant-based" UCI and/or data transmission. By doing so, UE-k can select any subset of the $N_k$ pre-configured UL reporting resources that are free (unused) for the purpose of the UE-triggered/initiated SP UBRI reporting in slot n+Δ (step 1226).

Any of the above variation embodiments can be utilized independently or in combination with at least one other variation embodiment.

Figure 13:
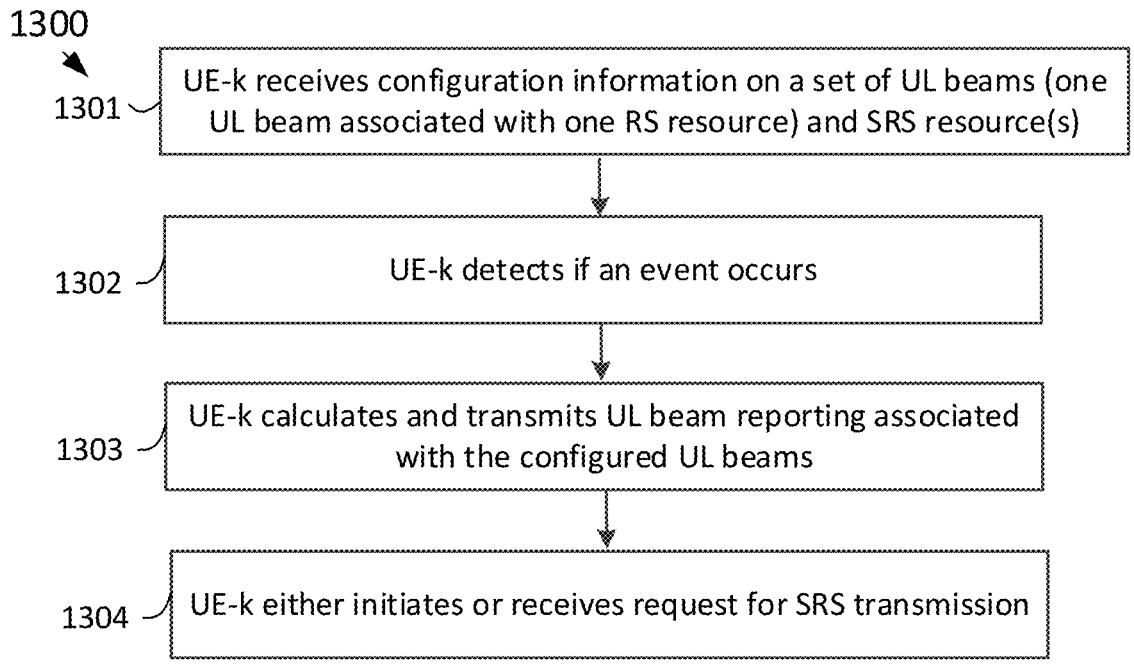
FIG. 13 illustrates a flowchart for an example method wherein a UE receives configuration information on beam reporting and UL reporting resource according to one or more embodiments of the present disclosure.

FIG. 13 illustrates a flowchart for an example method 1300 wherein a UE receives configuration information on UL beams and SRS resources according to an embodiment of the present disclosure. For example, the method 1300 can be performed by the UE 116. The embodiment of the method 1300 shown in FIG. 13 is for illustration only.

The method 1300 begins with the UE (termed UE-k) receiving, from a base station, configuration information on a set of UL beams (wherein one UL beam is associated with one RS resource—termed the reference/source RS resource) and a set of SRS resources for UE-k (step 1301). As described above, this source RS can be DL measurement RS and/or UL measurement RS. UE-k, via measurements, performs detection to if an event occurs (step 1302). UE-k also calculates and transmits UL beam reporting associated with the configured UL beams (1303). When an event occurs, UE-k either initiates or receives request for SRS transmission (step 1304).

The UL beam reporting represents the condition of the UL channel used for data transmission. When beam correspondence holds, UE-k can measure a DL measurement RS such as CSI-RS (either NZP or ZP) and/or SSB to estimate the quality of the UL channel. Applicable metrics can include at least one beam metric (such as CSI-RSRP, CSI-SINR, SSB-RSRP, SSB-SINR, or any combination or modification thereof) or CQI, each accompanied by the respective CRI or SSB-RI. The event includes at least one of the RSRP or SINR value measured from at least one downlink reference signal (DL RS) smaller than a threshold. When the event occurs, the SRS is subsequently transmitted on one of the configured SRS resources. Optionally, a pre-notification message and, subsequently, the SRS are transmitted on one of the configured SRS resources after the event occurs. The UL beam reporting includes an UL beam recommendation and is transmitted after the event occurs. Optionally, the UL beam reporting includes an UL beam recommendation and is transmitted after the event occurs and after transmitting a pre-notification message.

Figure 14:
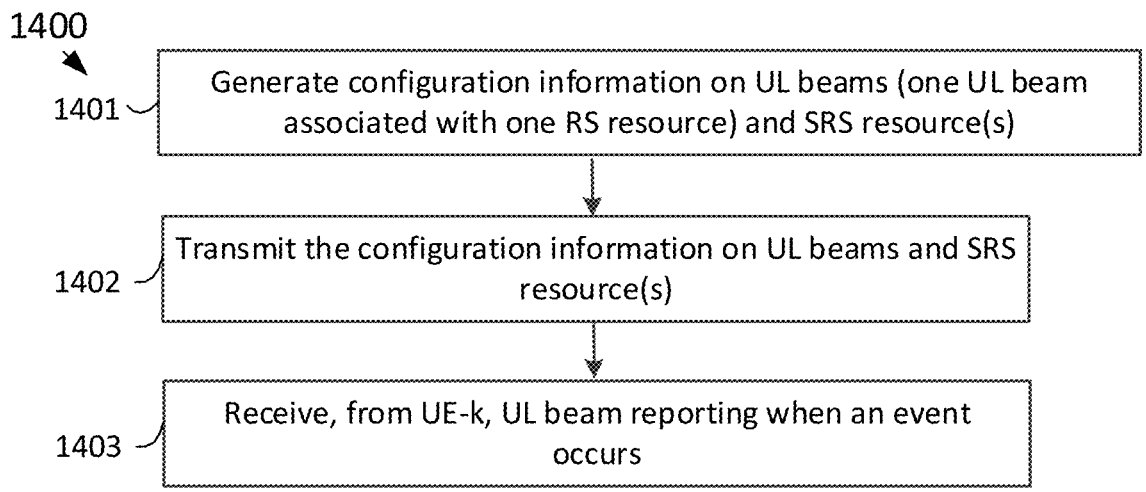
FIG. 14 illustrates a flowchart for an example method wherein a BS generates a configuration information on beam reporting and UL reporting resource according to one or more embodiments of the present disclosure.

FIG. 14 illustrates a flowchart for an example method 1400 wherein a BS generates configuration information on UL beams and SRS resources to a UE (labeled as UE-k) according to an embodiment of the present disclosure. For example, the method 1400 can be performed by the BS 102. The embodiment of the method 1400 shown in FIG. 14 is for illustration only.

The method 1400 begins with the BS generating, to UE-k, configuration information on a set of uplink (UL) beams and at least one associated sounding reference signal (SRS) resource (step 1401). Then, the BS also transmits the configuration information for the UL beams and the SRS resource (step 1402). The BS also receives, from the UE, an UL beam reporting associated with at least one of the configured UL beams when an event occurs.

The UL beam reporting represents the condition of the UL channel used for data transmission. When beam correspondence holds, UE-k can measure a DL measurement RS such as CSI-RS (either NZP or ZP) and/or SSB to estimate the quality of the UL channel. Applicable metrics can include at least one beam metric (such as CSI-RSRP, CSI-SINR, SSB-RSRP, SSB-SINR, or any combination or modification thereof) or CQI, each accompanied by the respective CRI or SSB-RI. The event includes at least one of the RSRP or SINR value measured from at least one downlink reference signal (DL RS) smaller than a threshold.

When the event occurs, the SRS is subsequently transmitted on one of the configured SRS resources. Optionally, a pre-notification message and, subsequently, the SRS are transmitted on one of the configured SRS resources after the event occurs.

The UL beam reporting includes an UL beam recommendation and is transmitted after the event occurs. Optionally, the UL beam reporting includes an UL beam recommendation and is transmitted after the event occurs and after transmitting a pre-notification message Although FIGS. 13 and 14 illustrate examples of methods for receiving configuration information and configuring a UE, respectively, various changes can be made to FIGS. 13 and 14. For example, while shown as a series of steps, various steps in each figure can overlap, occur in parallel, occur in a different order, occur multiple times, or not be performed in one or more embodiments.

Although the present disclosure has been described with an example embodiment, various changes and modifications can be suggested by or to one skilled in the art. It is intended that the present disclosure encompass such changes and modifications as fall within the scope of the appended claims.

What is claimed:
1. A user equipment (UE) comprising:
a transceiver configured to receive configuration information on a set of uplink (UL) beams and at least one associated sounding reference signal (SRS) resource; and
a processor operably connected to the transceiver, the processor configured to:
  detect that an event occurs, and
  calculate an UL beam reporting associated with at least one of the UL beams,
wherein the transceiver is further configured to:
  initiate or receive a request for an SRS transmission, and
  transmit the UL beam reporting after the event occurs.

2. The UE of claim 1, wherein the transceiver is configured to transmit the SRS transmission on one of the at least one associated SRS resource after the event occurs and in response to reception of the request for the SRS transmission.

3. The UE of claim 1, wherein to initiate the SRS transmission, the transceiver is configured to:
transmit a pre-notification message indicating the SRS transmission after the event occurs; and
transmit the SRS transmission on one of the at least one associated SRS resource after transmission of the pre-notification message.

4. The UE of claim 3, wherein:
to detect that the event occurs, the processor is configured to determine that at least one of a reference signal receive power (RSRP) value and a signal to noise ratio (SINR) value measured from at least one downlink reference signal (DL RS) is smaller than a threshold, and
the pre-notification message is transmitted in response to detection that the event occurs.

5. The UE of claim 1, wherein the transceiver is further configured to transmit an UL beam recommendation in the UL beam reporting after the event occurs.

6. The UE of claim 1, wherein the transceiver is further configured to:
transmit a pre-notification message indicating transmission of an UL beam recommendation after the event occurs; and
transmit the UL beam recommendation in the UL beam reporting after transmission of the pre-notification message.

7. The UE of claim 6, wherein:
to detect that the event occurs, the processor is configured to determine that at least one of a reference signal receive power (RSRP) value and a signal to noise ratio (SINR) value measured from at least one downlink reference signal (DL RS) is smaller than a threshold, and
the pre-notification message is transmitted in response to detection that the event occurs.

8. A base station (BS) comprising:
a processor configured to:
generate configuration information on a set of uplink (UL) beams and at least one associated sounding reference signal (SRS) resource; and
a transceiver operably connected to the processor, the transceiver configured to:
transmit the configuration information for the UL beams and the at least one associated SRS resource;
receive or transmit a request for an SRS transmission; and
receive an UL beam reporting associated with at least one of the UL beams after an event occurs.

9. The BS of claim 8, wherein the transceiver is configured to receive the SRS transmission on one of the at least one associated SRS resource after the event occurs and in response to transmission of the request for the SRS transmission.

10. The BS of claim 8 wherein the transceiver is configured to:
receive a pre-notification message indicating the SRS transmission after the event occurs; and
receive the SRS transmission on one of the at least one associated SRS resource after reception of the pre-notification message.

11. The BS of claim 10, wherein the event includes at least one of a reference signal receive power (RSRP) value and a signal to noise ratio (SINR) value measured from at least one downlink reference signal (DL RS) being smaller than a threshold.

12. The BS of claim 8, wherein the transceiver is further configured to receive an UL beam recommendation in the UL beam reporting after the event occurs.

13. The BS of claim 8, wherein the transceiver is further configured to:
receive a pre-notification message indicating transmission of an UL beam recommendation after the event occurs; and
receive the UL beam recommendation in the UL beam reporting after reception of the pre-notification message.

14. A method for operating a user equipment (UE), the method comprising:
receiving configuration information on a set of uplink (UL) beams and at least one associated sounding reference signal (SRS) resource;
detecting that an event occurs;
calculating an UL beam reporting associated with at least one of the UL beams;
initiating or receiving a request for an SRS transmission; and
transmitting the UL beam reporting after the event occurs.

15. The method of claim 14, further comprising transmitting the SRS transmission on one of the at least one associated SRS resource after the event occurs.

16. The method of claim 14, wherein initiating or receiving the request for the SRS transmission comprises initiating the SRS transmission by:
transmitting a pre-notification message indicating the SRS transmission after the event occurs; and
transmitting the SRS transmission on one of the at least one associated SRS resource after transmission of the pre-notification message.

17. The method of claim 16, wherein:
detecting that the event occurs comprises determining that at least one of a reference signal receive power (RSRP) value and a signal to noise ratio (SINR) value measured from at least one downlink reference signal (DL RS) is smaller than a threshold, and
the pre-notification message is transmitted in response to detection that the event occurs.

18. The method of claim 14, wherein transmitting the UL beam reporting comprises transmitting an UL beam recommendation in the UL beam reporting after the event occurs.

19. The method of claim 14, further comprising:
transmitting a pre-notification message indicating transmission of an UL beam recommendation after the event occurs,
wherein transmitting the UL beam reporting comprises transmitting the UL beam recommendation in the UL beam reporting after transmitting the pre-notification message.

20. The method of claim 19, wherein:
detecting that the event occurs comprises determining that at least one of a reference signal receive power (RSRP) value and a signal to noise ratio (SINR) value measured from at least one downlink reference signal (DL RS) is smaller than a threshold, and
the pre-notification message is transmitted in response to detection that the event occurs.

* * * * *